US012574727B2

(12) United States Patent
Nakamura

(10) Patent No.: US 12,574,727 B2
(45) Date of Patent: Mar. 10, 2026

(54) EMERGENCY REPORTING SYSTEM FOR VEHICLE, AND VEHICLE

(71) Applicant: SUBARU CORPORATION, Tokyo (JP)

(72) Inventor: Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 212 days.

(21) Appl. No.: 17/871,256

(22) Filed: Jul. 22, 2022

(65) Prior Publication Data

US 2023/0041885 A1 Feb. 9, 2023

(30) Foreign Application Priority Data

Aug. 3, 2021 (JP) .................................. 2021-127478

(51) Int. Cl.
*H04W 12/065* (2021.01)
*H04W 4/40* (2018.01)
*H04W 4/90* (2018.01)

(52) U.S. Cl.
CPC ........... *H04W 12/065* (2021.01); *H04W 4/40* (2018.02); *H04W 4/90* (2018.02)

(58) Field of Classification Search
CPC ............ H04L 2463/082; H04W 12/06; H04W 12/065; H04W 12/63; H04W 4/40; H04W 4/44; H04W 4/90
See application file for complete search history.

(56) References Cited

U.S. PATENT DOCUMENTS 11,979,796 B2 * 5/2024 Jackson ............... G08G 1/0965
2007/0159309 A1 7/2007 Ito et al.
2015/0100348 A1 4/2015 Connery et al.
2018/0089460 A1 * 3/2018 Kirk ........................ H04W 4/40
2020/0285872 A1 * 9/2020 Surendran ............ G06V 40/172
(Continued)

FOREIGN PATENT DOCUMENTS

JP 2003-065780 A 3/2003
JP 2007-094935 A 4/2007
(Continued)

OTHER PUBLICATIONS

Office Action dated Jun. 10, 2025, issued in corresponding Japan Patent Application No. 2021-127478, 6 pages.
(Continued)

*Primary Examiner* — Greg C Bengzon
(74) *Attorney, Agent, or Firm* — Rimon P.C.

(57) ABSTRACT

An emergency reporting system for a vehicle includes a server memory, an acquisition control processor, and first and second authentication processors. The server memory holds personalized emergency data regarding an occupant to be on board the vehicle or access data to the personalized emergency data. The acquisition control processor makes acquirable the personalized emergency data or the access data held in the server memory regarding the occupant on board the vehicle in which an emergency situation is detected by a detector of the vehicle, in a case where a server apparatus receives an emergency report from the vehicle in which the emergency situation is detected, and at least a combination of the occupant and the vehicle is authenticated by the second authentication processor.

17 Claims, 9 Drawing Sheets

(56) References Cited

U.S. PATENT DOCUMENTS

| | | | | |
|---|---|---|---|---|
| 2021/0309182 A1* | 10/2021 | Ragunathan | ......... | G06V 40/166 |
| 2022/0014907 A1* | 1/2022 | Boyd | ...................... | H04W 4/46 |

FOREIGN PATENT DOCUMENTS

| | | | |
|---|---|---|---|
| JP | 2015-092338 A | 5/2015 |
| JP | 2020-154996 A | 9/2020 |
| JP | 2021-012403 A | 2/2021 |

OTHER PUBLICATIONS

Notice of Reasons for Refusal received in Japanese Patent Application No. 2021-127478, dated Mar. 18, 2025.

* cited by examiner

EMERGENCY REPORTING SYSTEM FOR VEHICLE, AND VEHICLE

CROSS-REFERENCE TO RELATED APPLICATIONS

This application claims priority from Japanese Patent Application No, 2021-127478 filed on Aug. 3, 2021, the entire contents of which are hereby incorporated by reference.

BACKGROUND

The technology relates to an emergency reporting system for a vehicle, and a vehicle.

In a case where a vehicle such as an automobile is involved in an unexpected incident, one of possibilities is to make an emergence report of the incident.

For example, automatic emergency reporting systems for automobiles, e.g., an AACN (Advanced Automatic Collision Notification), have been in practical use. In the AACN, automobiles are provided with an automatic reporting device. If any automobile is involved in an unexpected incident, the automobile transmits an emergency report to a server apparatus of a call center with the use of the automatic reporting device. In the call center, an operator checks the emergency report received by the server apparatus, and requests a dispatch team such as a helicopter ambulance or an ambulance team for a dispatch. Thus, the dispatch team can head for the site promptly, to make an emergency response.

Japanese Unexamined Patent Application Publication (JP-A) No. 2003-065780 discloses a mobile body data providing system that transmits, for example, positional data regarding a mobile body to a server apparatus.

SUMMARY

An aspect of the technology provides an emergency reporting system for a vehicle. The emergency reporting system includes the vehicle and a server apparatus. The vehicle includes a detector configured to detect an emergency situation of the vehicle with an occupant on board. The server apparatus is configured to receive an emergency report from the vehicle in which the emergency situation is detected. The emergency reporting system includes a server memory, an acquisition control processor, a first authentication processor, and a second authentication processor. The server memory is provided in the server apparatus. The server memory is configured to hold personalized emergency data regarding the occupant to be on board the vehicle or access data to the personalized emergency data. The acquisition control processor is configured to control whether to permit acquisition of the personalized emergency data or the access data to the personalized emergency data held in the server memory. The first authentication processor is configured to authenticate the occupant on board the vehicle. The second authentication processor is configured to authenticate a combination of the occupant on board the vehicle and the vehicle, on the condition that the occupant on board the vehicle is authenticated by the first authentication processor. The acquisition control processor is configured to permit the acquisition of the personalized emergency data or the access data to the personalized emergency data held in the server memory regarding the occupant on board the vehicle in which the emergency situation is detected by the detector of the vehicle, in a case where the server apparatus receives the emergency report from the vehicle in which the emergency situation is detected, and at least the combination of the occupant and the vehicle is authenticated by the second authentication processor.

An aspect of the technology provides a vehicle configured to make an emergency report to a server apparatus in a case where an emergency situation of the vehicle is detected. The server apparatus includes a server memory configured to hold personalized emergency data regarding an occupant to be on board the vehicle or access data to the personalized emergency data. The vehicle includes at least a detector, out of the detector, an acquisition control processor, a first authentication processor, and a second authentication processor. The detector is configured to detect the emergency situation of the vehicle. The acquisition control processor is configured to control whether to permit acquisition of the personalized emergency data or the access data to the personalized emergency data held in the server memory. The first authentication processor is configured to authenticate the occupant on board the vehicle. The second authentication processor is configured to authenticate a combination of the occupant on board the vehicle and the vehicle on the condition that the occupant on board the vehicle is authenticated by the first authentication processor. The acquisition control processor is configured to control whether to permit the acquisition of the personalized emergency data or the access data to the personalized emergency data held in the server memory regarding the occupant on board the vehicle in which the emergency situation is detected by the detector of the vehicle, on the basis of at least whether or not the combination of the occupant and the vehicle is authenticated by the second authentication processor.

An aspect of the technology provides a vehicle configured to make an emergency report to a server apparatus in a case where an emergency situation of the vehicle is detected. The server apparatus includes a server memory configured to hold personalized emergency data regarding an occupant to be on board the vehicle or access data to the personalized emergency data. The vehicle includes an acceleration sensor and circuitry. The acceleration sensor is configured to detect the emergency situation of the vehicle with the occupant on board. The circuitry is configured to at least detect the emergency situation of the vehicle with the occupant on board, out of: being configured to detect the emergency situation of the vehicle with the occupant on board; being configured to control whether to permit acquisition of the personalized emergency data or the access data to the personalized emergency data held in the server memory; being configured to authenticate the occupant on board the vehicle; and being configured to authenticate a combination of the occupant on board the vehicle and the vehicle on the condition that the occupant on board the vehicle is authenticated by the circuitry. The circuitry is configured to control whether to permit the acquisition of the personalized emergency data or the access data to the personalized emergency data held in the server memory regarding the occupant on board the vehicle in which the emergency situation is detected by the acceleration sensor, on the basis of at least whether or not the combination of the occupant and the vehicle is authenticated by the circuitry.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
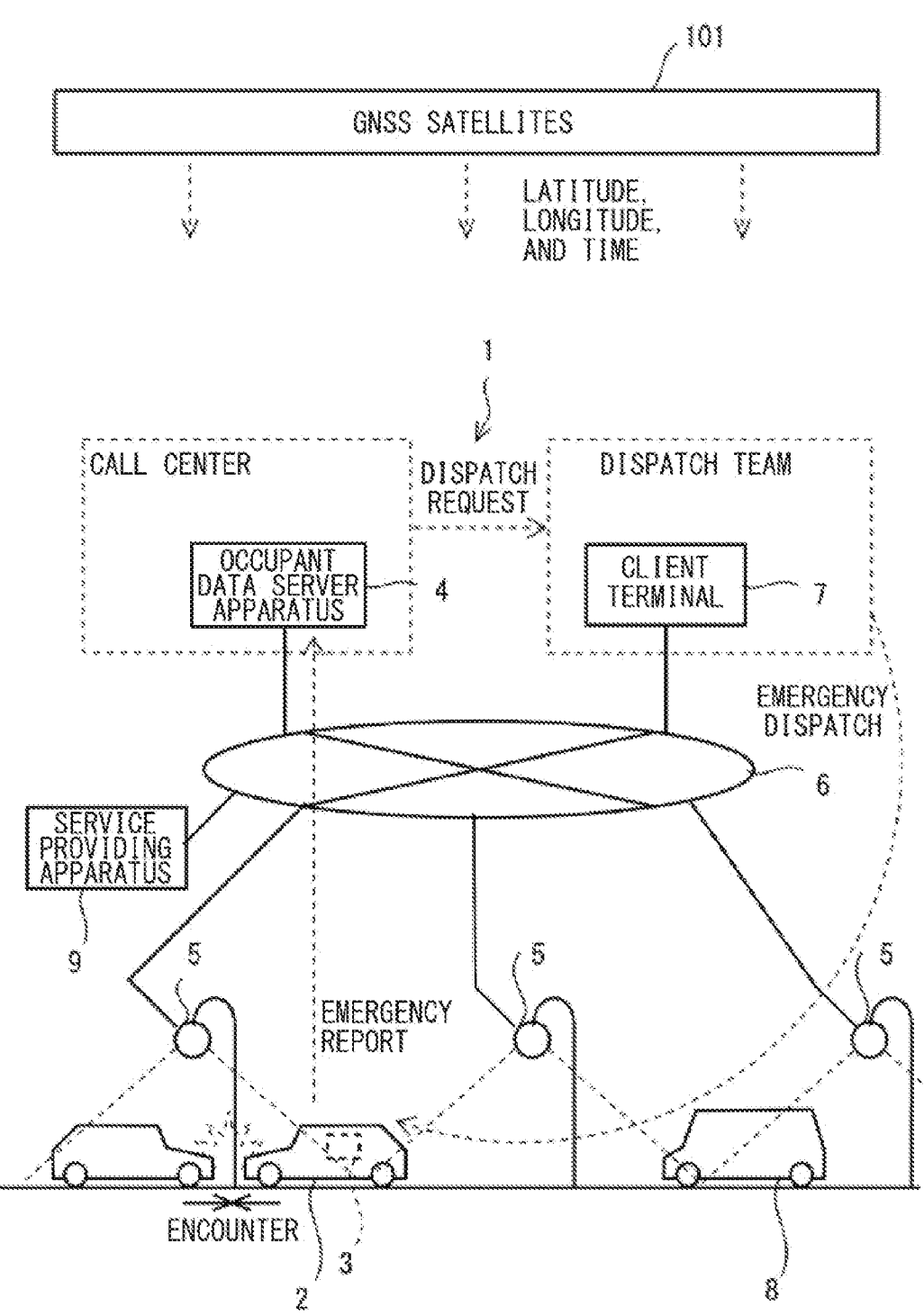
FIG. 1 is a schematic diagram of an example of a vehicle assistance system that serves as an emergency reporting system according to an embodiment of the technology.

Even if an occupant of a vehicle manages to send an emergency report to notify a dispatch team of occurrence of an emergency situation, the dispatch team is not necessarily able to provide an optimal emergency response. For example, an ambulance team is not necessarily able to provide an occupant in a particular health condition with an optimal emergency response.

Thus, an emergency reporting system still has had room for improvement in coping with an emergency situation of a vehicle.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 is a schematic diagram of an example of a vehicle assistance system that serves as an emergency reporting system 1 according to an embodiment of the technology.

The emergency reporting system 1 in FIG. 1 may include, without limitation, an automobile 2, an occupant data server apparatus 4, and a client terminal 7. The automobile 2 is configured to accommodate an occupant such as a driver. The occupant data server apparatus 4 may be used in a call center where an operator is on standby. The client terminal 7 may be used by a dispatch team, e.g., a fire department, that is able to make an emergency dispatch. It is to be noted that the call center may be provided with an unillustrated client terminal together with the occupant data server apparatus 4. The unillustrated client terminal is used by the operator. In one embodiment of the technology, the automobile 2 may serve as a "vehicle". The automobile 2 is not limited to those configured to travel by manual driving but may include those configured to travel by driver assistance or automated driving.

In the control system 3 of the automobile 2, a mobile communication equipment 25 described later may establish a wireless communication path with base stations 5. The base stations 5 are provided along a road and distributed over local areas. The mobile communication equipment 25 may transmit and receive data to and from the occupant data server apparatus 4 and a service providing apparatus 9 through the base stations 5 and a communication network 6.

The occupant who uses the automobile 2 may use network services provided by the service providing apparatus 9, in the automobile 2. Non-limiting examples of the network services may include telematics services, video and audio content provision services, sales services, settlement services, navigation services for route guidance and an automated driving control, information provision services such as tourist destinations, search provision services such as the World Wide Web, communication services such as telephones and conferences, online travel control services for, for example, a travel control of the automobile 2, and other application services. The occupant may use account data in the automobile 2, to couple the automobile 2 to the service providing apparatus 9. The account data is different for each of the network services. Thus, the occupant is able to use, in the automobile 2, the network services provided by the service providing apparatus 9.

The base stations 5 and the communication network 6 may include those for 5G provided by telecommunication carriers, or those for, for example, ACAS (Advanced Driver Assistance System) provided by, for example, public organizations.

Non-limiting examples of such an emergency reporting system 1 may include an AACN (Advanced Automatic Collision Notification). In the AACN, the control system 3 of the automobile 2 involved in an unexpected incident may automatically transmit an immediate emergency report to the occupant data server apparatus 4 or the unillustrated client terminal used in the call center, on the basis of detection of the incident.

For example, the occupant data server apparatus 4 that receives the emergency report may transmit a dispatch request to the client terminal 7 of the dispatch team, on the basis of the emergency report.

The dispatch team may be dispatched to the site by an emergency vehicle 8 such as an ambulance or a helicopter ambulance in response to the dispatch request from the call center. The dispatch team may provide those involved in the incident with emergency medical care in a short lead time from the transmission of the emergency report from the automobile 2.

In FIG. 1, an example is given in which the emergency reporting system 1 is used by a plurality of organizations in cooperation. Alternatively, the emergency reporting system 1 may be used independently by a single organization that manages an area including a road where, for example, the automobile 2 can travel, e.g., the police, the fire authorities, a government office, a hospital, a medical institution, a security company, and a management company.

Moreover, FIG. 1 illustrates GNSS satellites 101. Each apparatus in FIG. 1 is configured to receive radio waves from a plurality of the GNSS satellites 101 to obtain their position and the time. The radio waves carry positional data regarding the latitude and the longitude, and time data. The plurality of the apparatuses may receive the radio waves from the plurality of the GNSS satellites 101 cooperating with one another, making it possible to match, for example, their respective present time with high accuracy. It is possible to use the common time.

Figure 2:
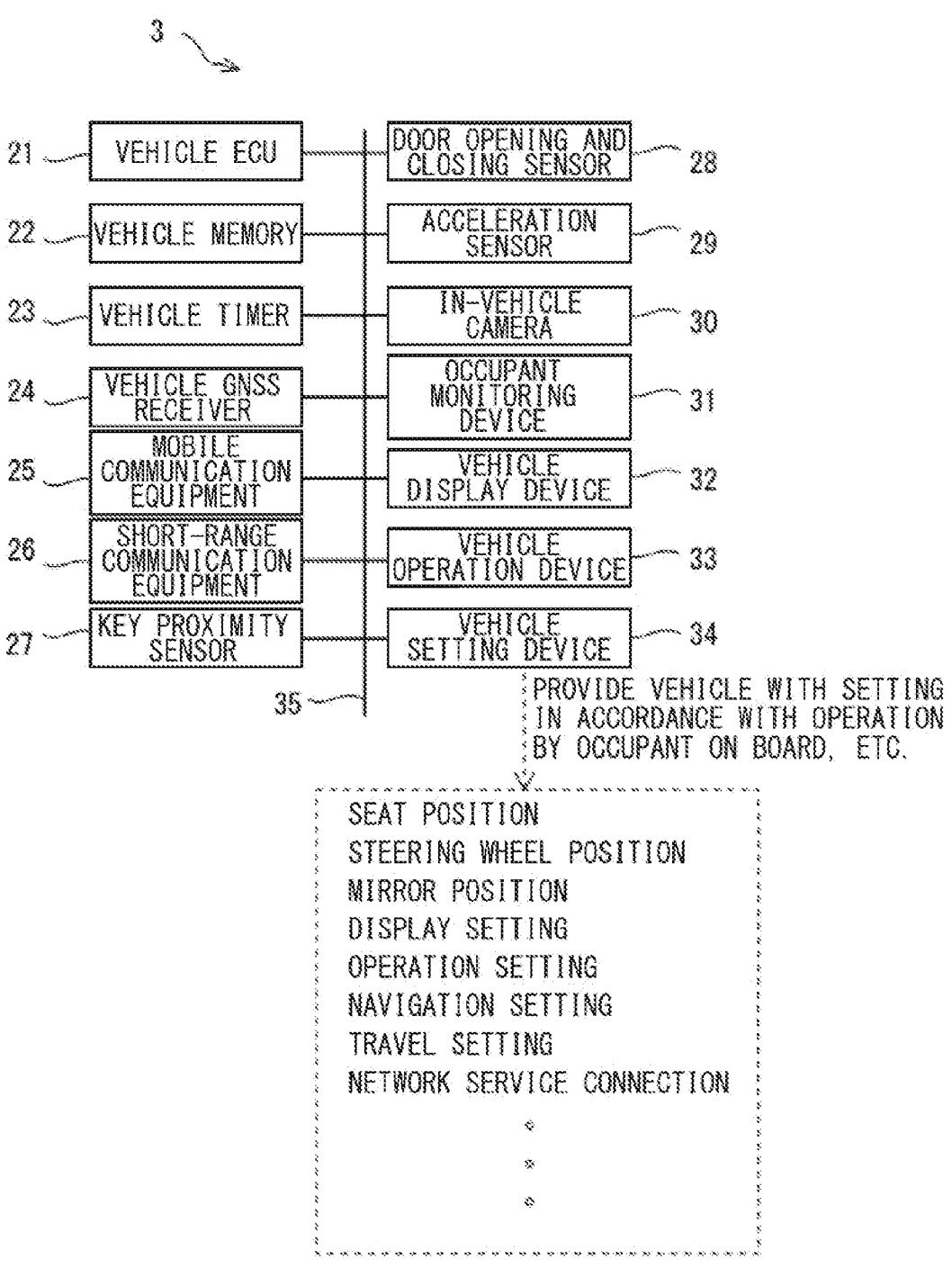
FIG. 2 is a block diagram of a control system of an automobile that is possibly involved in an emergency situation such as an unexpected incident in FIG. 1.

FIG. 2 is a block diagram of the control system 3 of the automobile 2 that is possibly involved in an emergency situation such as an unexpected incident in FIG.

The control system 3 of the automobile 2 in FIG. 2 may include, without limitation, a vehicle ECU (Electronic Control Unit) 21, a vehicle memory 22, a vehicle timer 23, a vehicle GNSS (Global Navigation Satellite System) receiver 24, the mobile communication equipment 25, a short-range communication equipment 26, a key proximity sensor 27, a door opening and closing sensor 28, an acceleration sensor 29, an in-vehicle camera 30, an occupant monitoring device 31, a vehicle display device 32, a vehicle operation device 33, a vehicle setting device 34, and a vehicle network 35 to which these are coupled.

The vehicle network 35 may include, without limitation, a wired communication network for the automobile 2 in conformity with, for example, CAN (Controller Area Network) and LIN (Local Interconnect Network). The vehicle network 35 may include a communication network such as LAN, or a combination thereof. A portion of the vehicle network 35 may include a wireless communication network.

The vehicle GNSS receiver 24 may receive the radio waves from the GNSS satellites 101 and generate a present position at which the automobile 2 is located, and the present time.

The vehicle timer 23 may measure time and the time. The time of the vehicle timer 23 may be calibrated by the present time of the vehicle GNSS receiver 24.

The mobile communication equipment 25 may establish, by wireless communication, a communication path with the base station 5 that includes the automobile 2 in its zone. This allows the mobile communication equipment 25 to transmit and receive data to and from a plurality of server apparatuses such as the occupant data server apparatus 4 and the service providing apparatus 9 through the base station 5 and the communication network 6.

The mobile communication equipment 25 may directly communicate with a mobile communication equipment 25 of another automobile and establish the communication path with the base station 5 through the intermediary of the relevant automobile. This also allows the mobile communication equipment 25 to transmit and receive data to and from the server apparatuses through the mobile communication equipment 25 of the intermediary automobile, the base station 5, and the communication network 6.

The key proximity sensor 27 may detect an occupant key 10 carried by an occupant in or near the automobile 2, by specific short-range wireless communication. The occupant key 10 may have identification data different from other occupant keys. The identification data regarding the occupant key 10 may be used as occupant identification data. For example, upon detecting the occupant key 10, the key proximity sensor 27 may generate a signal to unlock doors of the automobile 2 and output the signal to the vehicle network 35. This allows the doors of the automobile 2 to be automatically unlocked, allowing the occupant to open and close the doors of the automobile 2 and get in the automobile 2, for example, by just coming near the automobile 2, without unlocking the doors on their own. Moreover, in a case where the key proximity sensor 27 no longer detects the occupant key 10 of the occupant who has got off, the key proximity sensor 27 may generate a signal to lock the doors of the automobile 2 and output the signal to the vehicle network 35. This allows the doors of the automobile 2 to be automatically locked.

The short-range communication equipment 26 may establish, by short-range wireless communication, a communication path with the occupant terminal 11 carried by the occupant in or near the automobile 2. Non-limiting examples of short-range wireless communication standards may include IEEE (Institute of Electrical and Electronics Engineers) 802.15.1 and IEEE 802.11/b/g. Non-limiting examples of the occupant terminal 11 may include a mobile phone terminal and a wearable terminal that are configured to be coupled to the base station 5 of the telecommunication carriers. The short-range communication equipment 26 may detect, authenticate, and be coupled to the occupant terminal 11 carried by the occupant in or near the automobile 2. This allows the short-range communication equipment 26 to perform data communication with the occupant terminal 11.

In the occupant terminal 11, an application program for management or use of the automobile 2 may be installed. The application program may have different identification data from application programs to be installed in other occupant terminals. In this case, when the occupant terminal 11 in which the application program for a predetermined occupant is installed approaches the automobile 2, the short-range communication equipment 26 may generate a signal to unlock the doors of the automobile 2 and output the signal to the vehicle network 35, as with the key proximity sensor 27. Moreover, in a case where the short-range communication equipment 26 no longer detects the occupant terminal 11 of the occupant who has got off, the short-range communication equipment 26 may generate a signal to lock the doors of the automobile 2 and output the signal to the vehicle network 35. This allows the doors of the automobile 2 to be automatically locked.

The short-range communication equipment 26 may perform wired communication with the occupant terminal 11 by, for example, a USB cable, instead of short-range wireless communication. Coupling the short-range communication equipment 26 by wire to the occupant terminal 11 by, for example, the USB cable makes it possible for the short-range communication equipment 26 to recognize confirmingly that the occupant terminal 11 to which the short-range communication equipment 26 is coupled is brought into inside the automobile 2.

In a case where the control system 3 of the automobile 2 is devoid of the mobile communication equipment 25, the short-range communication equipment 26 may be coupled to the occupant terminal 11 that establishes a communication path with the base station 5. This makes it possible for the short-range communication equipment 26 to carry out data communication with the occupant data server apparatus 4 and the plurality of the service providing apparatuses 9 in place of the mobile communication equipment 25.

The door opening and closing sensor 28 may detect opening and closing of the unillustrated doors of the automobile 2. In a case where the automobile 2 includes a plurality of doors, e.g., a door on side on which a driver's seat is disposed and a door on side on which a passenger seat is disposed, the door opening and closing sensor 28 may be provided for each door.

The acceleration sensor 29 may detect an acceleration rate of the automobile 2 traveling. The acceleration sensor 29 may integrate the acceleration rate and detect a speed of the automobile 2 together.

In a case where the acceleration rate detected by the acceleration sensor 29 is greater than that on normal travel and is greater than a predetermined determination threshold, the acceleration sensor 29 is regarded as detecting the acceleration rate caused by an impact due to, for example, an encounter with other objects.

In one embodiment of the technology, the acceleration sensor 29 may serve as a "detector" configured to detect an unexpected incident in which the automobile 2 with the occupant on board is involved.

The in-vehicle camera 30 is provided in the automobile 2 for imaging of an inside of the automobile 2. The in-vehicle camera 30 may be of a narrow angle configured to perform imaging of only the driver of the automobile 2, or alternatively, the in-vehicle camera 30 may be of a wide angle configured to perform imaging of an entire cabin. A wide-angle captured image may include, along with the driver, an occupant as a fellow passenger other than the driver in the automobile 2. The captured image of the in-vehicle camera 30 may include biometric data regarding, for example, appearance and veins of the occupant.

The occupant monitoring device 31 may detect and identify the occupant on board the automobile 2, and monitor a state of the occupant, on the basis of, for example, the captured image of the in-vehicle camera 30. The occupant may sometimes become drowsy, look aside, or have an abnormal heart rate while on board. The occupant monitoring device 31 may monitor these conditions in real time on the basis of the captured image of the in-vehicle camera 30. In a case where the automobile 2 includes a millimeter-wave sensor that sends out a millimeter-wave toward inside the automobile, the occupant monitoring device 31 may use a detection result of the occupant by the millimeter-wave sensor together with the captured image of the in-vehicle camera 30, to detect and identify the occupant on board the automobile 2, and monitor the state of the occupant.

In one embodiment of the technology, the occupant monitoring device 31 may serve as the "detector" configured to detect an emergency situation of the automobile 2, on the condition that the state of the occupant being drowsy or unconscious continues for, for example, a predetermined, short period of time.

The vehicle display device 32 and the vehicle operation device 33 may constitute an HMI (Human Machine Interface) for the occupant in the automobile 2.

The vehicle display device 32 may include, without limitation, a liquid crystal display monitor. The vehicle display device 32 may be disposed in front of the driver's seat or in a center console, in the cabin of the automobile 2. The vehicle display device 32 may display an image for the occupant's view. A display screen of the vehicle display device 32 may include, for example, a setting screen to provide the automobile 2 with setting, a navigation screen, a meter screen that indicates a state of the automobile 2, a connection screen to the network service, a screen to provide the network service, without limitation.

The vehicle operation device 33 may include, without limitation, a touchscreen disposed on the liquid crystal display monitor. The vehicle operation device 33 may further include, without limitation, buttons, a pointing device, and a keypad. In a case where the vehicle operation device 33 constitutes a non-contact HMI, the vehicle operation device 33 may detect an operation on the basis of a motion of the occupant in the captured image of the in-vehicle camera 30. The occupant may make an operation, on the vehicle operation device 33, to allow the vehicle display device 32 to display, for example, the setting screen. Thus, the occupant may make an operation, on the setting screen, to set an initial screen or screen transitions of the vehicle display device 32. In addition, the occupant may make an operation, on the vehicle operation device 33, to allow the vehicle display device 32 to display, for example, the connection screen to the network service. Thus, the occupant may make an operation, on the connection screen, to input the account data.

The vehicle setting device 34 may provide each part of the automobile 2 with the occupant-dependent setting. For example, in a case where the occupant gets in the automobile 2 and makes a setting operation on, for example, the setting screen, the vehicle setting device 34 may acquire setting data and provide the automobile 2 with the setting. In a case where the occupant who has provided previous setting gets in again, the vehicle setting device 34 may acquire previous setting data from, for example, the vehicle memory 22, and provide the automobile 2 with the setting. Non-limiting examples of the data to be set in the automobile 2 by the occupant on board the automobile 2 may include a seat position, a steering wheel position, a mirror position, display setting, operation setting, navigation setting, and travel setting. Moreover, the vehicle setting device 34 may generate the account data at the network service to be used in the automobile 2 by the occupant, in accordance with an operation by the occupant, and establish the connection to the network service.

The vehicle memory 22 may hold programs and data. The data to be held in the vehicle memory 22 may include, without limitation, various setting data and navigation data set by the occupant with the use of the vehicle operation device 33. In this case, the vehicle memory 22 may include, without limitation, an FWD (Hard Disk Drive) and/or an SSD (Solid State Disk) as a nonvolatile memory configured to hold data without power supply. The vehicle memory 22 may temporarily hold communication data transmitted and received by, for example, the mobile communication equipment 25 and the short-range communication equipment 26.

The vehicle ECU 21 may include, without limitation, a microcomputer. The vehicle ECU 21 may read the programs from the vehicle memory 22 and execute the programs. Thus, the vehicle ECU 21 may serve as a processor configured to make an overall operation control including the travel control of the automobile 2. The microcomputer may be integrated with, for example, the vehicle memory 22 and the vehicle timer 23.

The vehicle ECU 21 as the processor of the automobile 2 may make the travel control of the automobile 2 by, for example, automated driving and driver assistance. The vehicle ECU 21 may control the automobile 2 with the use of the data held in the vehicle memory 22.

The vehicle ECU 21 may generate the setting data on the basis of the setting operation made on the automobile 2 by the occupant with the use of the vehicle display device 32 and the vehicle operating device 33. The vehicle ECU 21 may record the setting data in the vehicle memory 22, In this case, the vehicle ECU 21 is configured to read the setting data held in the vehicle memory 22 and provide each part of the automobile 2 with the setting with the use of the vehicle setting device 34. In a case where the control system 3 of the automobile 2 is devoid of the vehicle setting device 34 configured to provide setting, the vehicle ECU 21 may provide each part of the automobile 2 with the setting on its own. This saves the occupant from making the setting operation every time they get in, FIG. 3 is a block diagram of a computer apparatus 40 that serves as the occupant data server apparatus 4 in FIG. 1.

Figure 3:
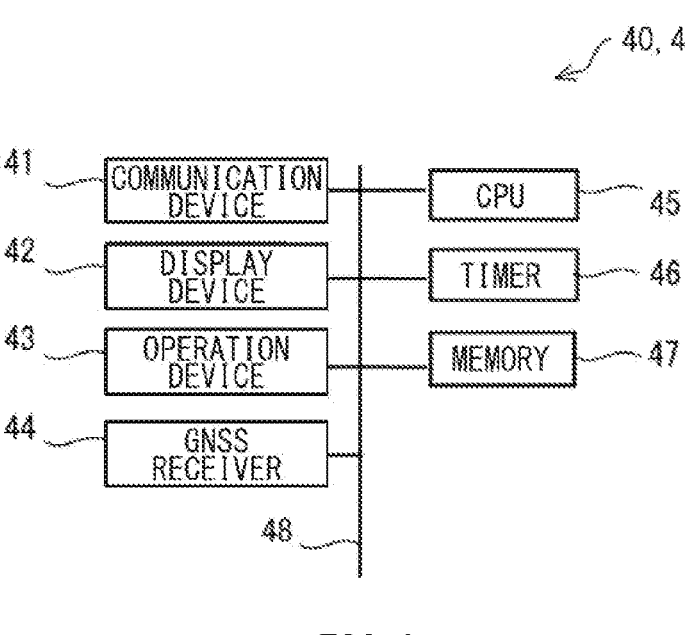
FIG. 3 is a block diagram of a computer apparatus that serves as, for example, an occupant data server apparatus in FIG. 1.

The computer apparatus 40 in FIG. 3 may include, without limitation, a communication device 41, a display device 42, an operation device 43, a GLASS receiver 44, a CPU 45, a timer 46, and a memory 47.

The occupant data server apparatus 4 is configured to receive the emergency report from the automobile 2 in which an emergency situation is detected.

The service providing apparatus 9, the client terminal 7, and the occupant terminal 11 in FIG. 1 may also include the computer apparatus 40 having a similar hardware configuration to FIG. 3.

The communication device 41 may be coupled to the communication network 6. The communication device 41 may transmit and receive communication data of the computer apparatus 40.

The display device 42 may include, without limitation, a liquid crystal display monitor. The display device 42 may provide an operator of the computer apparatus 40 with screen display.

The operation device 43 may include, without limitation, a keyboard and/or a pointing device. The operation device 43 may be operated by the operator of the computer apparatus 40.

The GNSS receiver 44 may receive the radio waves from the GNSS satellites 101 and generate a position at which the computer apparatus 40 is located, and the present time.

The timer 46 may measure time and the time. The time of the timer 46 may be calibrated by the present time of the GNSS receiver 44.

The memory 47 may include, without limitation, non-volatile memory. The memory 47 may hold programs and data.

The CPU 45 may include, without limitation, a microcomputer. The CPU 45 may read the programs from the memory 47 and execute the programs. Thus, the CPU 45 may serve as a processor configured to make an overall operation control of the computer apparatus 40.

As described, in the automobile 2 illustrated in FIG. 1, in a case where the occupant on board adjusts, for example, the seat position, the setting may be recorded in the vehicle memory 22. In a case where the occupant gets in again, the setting may be acquired from the vehicle memory 22 to provide the automobile 2 with the setting. This makes it possible to provide the automobile 2 with the occupant-dependent setting. It is possible to make the occupant-dependent setting available in the automobile 2 to the occupant, while saving the occupant from making the setting operation on their own when the occupant gets in again.

In recent years, however, the automobile 2 may include, for example, the advanced mobile communication equipment 25. This makes it possible for the occupant to use the network service such as the telematics service, the content service, and the sales service, while on board the automobile 2.

In such an automobile 2, after the occupant gets in the automobile 2, the occupant may have to adjust the seat position according to their physical constitution, and make an operation to establish connection to the various network services. In particular, in a case where the occupant wants to use a plurality of the network services while on board, the occupant has to make the operation to establish connection one by one to the plurality of the network services they want to use. This hinders the occupant from starting travel immediately after they get in the automobile 2.

A possible countermeasure against such a situation may include allowing the automobile 2 to record the account data at the network services regarding each occupant in the vehicle memory 22 of the automobile 2 in the figure. The account data may be read on the occasion of, for example, boarding, to allow the vehicle setting device 34 to establish the connection to the network services.

In the case where the setting data is recorded as described above, in the automobile 2, it is necessary to identify and authenticate the occupant on board the automobile 2 to keep the setting data from being available to anyone who gets in the automobile 2.

Combining these techniques makes it possible for the automobile 2 to identify the occupant on board by, for example, biometric authentication, acquire occupant data held in the automobile 2, and provide the automobile 2 with the setting.

However, depending on the contents of the occupant data, it would not be sufficiently safe to make the occupant data held in the automobile 2 acquirable and available solely on the basis of the authentication of the occupant on board. For example, it is assumed that the account data at the settlement service to be used in the sales service, etc. is strongly requested to be kept unavailable to other people except for an authorized occupant. If the data becomes available by simply identifying and authenticating an occupant, there is not low possibility that the settlement service is illegally acquired or used by another person due to, for example, boarding by spoofing. High safety is desired to prevent the occupant data from being used by other people.

It is desirable to enhance safety of the occupant data to be used in the automobile 2, while ensuring convenience of authorized use.

Moreover, as described, the automobile 2 may be sometimes involved in an emergency situation. In this case, one of possibilities is to allow the automobile 2 to automatically transmit the emergency report. However, even if the automobile 2 manages to send the emergency report automatically and immediately, the dispatch team is not necessarily able to provide an optimal emergency response. For example, possibility is that an ambulance team is not necessarily able to provide an occupant in a particular health condition with an optimal emergency response in the site of emergency, without data regarding the health condition.

Thus, in the automobile 2, it is desirable to provide improvement in the emergency response.

Figure 4:
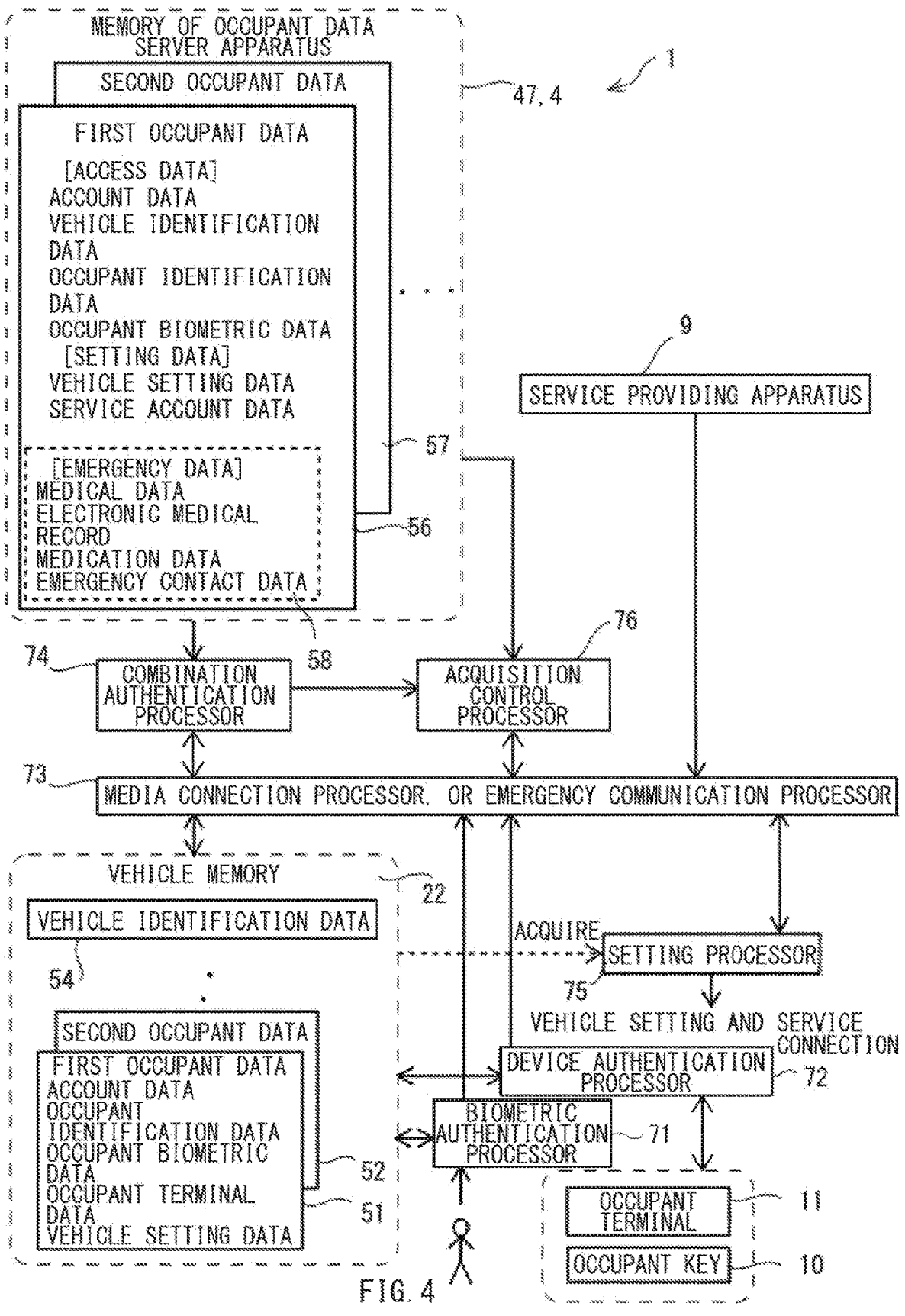
FIG. 4 is a block diagram illustrating where to record occupant data in the emergency reporting system for the automobile in FIG. 1, and a plurality of processors in the emergency reporting system.

FIG. 4 is a block diagram illustrating where to record the occupant data in the emergency reporting system 1 for the automobile 2 in FIG. 1, and a plurality of processors in the emergency reporting system 1.

FIG. 4 illustrates where to record the occupant data regarding the plurality of the occupants who uses the automobile 2, and various processors to provide the automobile 2 with the setting of such data in accordance with the occupant on board.

In FIG. 4, in the vehicle memory 22 of the automobile 2, first occupant data 51 and second occupant data 52 may be held as the occupant data regarding the plurality of the occupants who uses the automobile 2. In addition, for example, in the vehicle memory 22, vehicle identification data 54 may be held. The vehicle identification data 54 is unique to the automobile 2.

In the vehicle memory 22, for example, the first occupant data 51 regarding a first occupant may include authentication data, together with vehicle setting data to be set by the first occupant for themselves when the first occupant uses the automobile 2. The authentication data may include, without limitation, the account data regarding the first occupant in the occupant data server apparatus 4, occupant identification data, occupant biometric data, and data regarding the occupant terminal 11 used by the first occupant. The occupant identification data may be allotted to the first occupant by, for example, the occupant monitoring device 31 of the automobile 2. The occupant biometric data may indicate physical features of, for example, the head of the first occupant. In the following, the data regarding the occupant terminal 11 is referred to as occupant terminal data.

The occupant data regarding other occupants, e.g., the second occupant data 52 regarding a second occupant, may also include, without limitation, the vehicle setting data, the account data, the occupant identification data, the occupant biometric data, and the occupant terminal data regarding the respective occupants.

As described, the vehicle setting data regarding each occupant who uses the automobile 2 may be recorded in the vehicle memory 22 of the automobile 2. This makes it possible for the vehicle ECU 21 and the vehicle setting device 34 of the automobile 2 to provide the automobile 2 with the setting in accordance with the occupant on board, even under a situation in which communication with the outside is unavailable to the automobile 2.

In the memory 47 of the occupant data server apparatus 4, the occupant data regarding the plurality of the occupants whose accounts are registered in the occupant data server apparatus 4 may be held for each occupant. In one embodiment of the technology, the memory 47 may serve as a "server memory". FIG. 4 illustrates first occupant data 56 regarding the first occupant and second occupant data 57 regarding the second occupant. Such occupant data may be generated and held in the memory 47 by, for example, direct log-in registration to the occupant data server apparatus 4 by a user as the occupant with the use of the account data.

For example, the first occupant data 56 regarding the first occupant in the memory 47 of the occupant data server apparatus 4 may include, without limitation, access data regarding the first occupant, setting data in the automobile 2 regarding the first occupant, and emergency data regarding the first occupant.

The access data regarding the first occupant may include, without limitation, the account data, the vehicle identification data regarding the automobile 2 the first occupant uses as an owner, the occupant identification data regarding the first occupant in the automobile 2, and the occupant biometric data regarding the first occupant. The account data is used on the occasion that the first occupant directly logs in to the occupant data server apparatus 4. The account data may include, without limitation, a user ID and a password for the access to the occupant data server apparatus 4. The occupant identification data and the occupant biometric data in the memory 47 of occupant data server apparatus 4 may correspond to the occupant identification data and the occupant biometric data held for each occupant in the vehicle memory 22 of the automobile 2. The occupant biometric data may serve as a password for the occupant identification data.

The setting data in the automobile 2 regarding the first occupant may include, without limitation, the vehicle setting data to be set in the automobile 2 for the first occupant, and the account data at the network services to be used in the automobile 2 by the first occupant. The vehicle setting data may include, without limitation, data regarding, for example, the seat position set in the automobile 2 by the first occupant. The vehicle identification data to be held in the memory 47 of the occupant data server apparatus 4 may coincide with the vehicle identification data 54 to be held in the vehicle memory 22 of the automobile 2.

The emergency data regarding the first occupant may include, without limitation, medical data, an electronic medical record, and medication data that indicate the health condition of the first occupant, and emergency contact data regarding the first occupant.

The occupant data regarding other occupants, e.g., the second occupant data 57 regarding the second occupant, may also include similar data.

The personalized occupant data may further include access data to other server apparatuses that holds the medical data, the electronic medical record, and the medication data.

As described, the personalized occupant data held in the memory 47 of the occupant data server apparatus 4 may include the emergency data such as health data that is quite personal. The emergency data is useful in the emergency response, but it is desirable to limit the use of the emergency data in other cases than the emergency response. It is desirable to provide more strict management of the use of the emergency data than that of other kind of data, e.g., the access data and the setting data.

As illustrated in FIG. 4, the emergency reporting system 1 may mainly include, without limitation, a biometric authentication processor 71, a device authentication processor 72, a media connection processor 73, a combination authentication processor 74, an acquisition control processor 76, and a setting processor 75. In one embodiment of the technology, the media connection processor 73 may serve as an "emergency communication processor". These processors may be realized by the apparatuses executing programs. In this embodiment, among these processors, the biometric authentication processor 71, the device authentication processor 72, the media connection processor 73, and the setting processor 75 may be realized by the vehicle ECU 21 of the control system 3 of the automobile 2. The remainders, i.e., the combination authentication processor 74 and the acquisition control processor 76, may be realized by the CPU 45 of the occupant data server apparatus 4. The processors in the emergency reporting system 1 may be assigned as appropriate to the vehicle ECU 21 of the control system 3 of the automobile 2 and to the CPU 45 of the occupant data server apparatus 4 in accordance with, for example, system specifications and design concepts.

The biometric authentication processor 71 may biometric-authenticate the occupant on board the automobile 2. The biometric authentication processor 71 may acquire, for example, the captured image of the occupant on board the automobile 2 with the use of, for example, the in-vehicle camera 30 of the automobile 2. The biometric authentication processor 71 may extract physical features about, for example, the head of the occupant included in the acquired data, and compare the features with the occupant biometric data regarding the plurality of the occupants registered in advance in the vehicle memory 22. The occupant biometric data registered in the vehicle memory 22 may include, without limitation, the captured image of the face of the occupant on the occasion of the registration of the occupant in the automobile 2. The captured image may include, without limitation, data such as facial features and a vein pattern of the head. In a case with presence of the occupant biometric data that coincides with the captured image of the occupant on board the automobile 2 at a certain degree of coincidence or higher, the biometric authentication processor 71 may authenticate the occupant whose occupant biometric data is included in the occupant data in the vehicle memory 22, as the occupant on board the automobile 2. In a case where the occupant biometric data regarding the plurality of the occupants held in the vehicle memory 22 includes the vein pattern of the head of each occupant or the vein pattern of a portion of the head of each occupant, it is possible for the biometric authentication processor 71 to authenticate accurately the occupant on board the automobile 2, without being affected by changes in the direction of the head of the occupant. The biometric authentication processor 71 may output a biometric authentication result of the occupant on board the automobile 2 to the media connection processor 73.

As described, the biometric authentication processor 71 is configured to authenticate the occupant on board the automobile 2. In one embodiment of the technology, the biometric authentication processor 71 may serve a "first authentication processor" in the automobile 2.

The device authentication processor 72 may authenticate a device carried by the occupant on board the automobile 2. The device authentication processor 72 may acquire, for example, the identification data regarding the occupant terminal 11 and/or the identification data regarding the occupant key 10 to which the short-range communication equipment 26 is coupled by wireless communication, with the use of, for example, the short-range communication equipment 26 or the key proximity sensor 27 of the automobile 2. The device authentication processor 72 may compare the identification data with the occupant terminal data regarding the plurality of the occupants held in the vehicle memory 22. In a case where the identification data regarding the occupant terminal 11 coincides with the occupant terminal data, the device authentication processor 72 may authenticate the occupant whose occupant terminal data is included in the occupant data, as the occupant on board the automobile 2. At this occasion, the device authentication processor 72 may determine whether or not the occupant terminal 11 is present in the vehicle on the basis of data such as a communication response speed between the short-range communication equipment 26 and the occupant terminal 11, or on the basis of prioritized coupling between the short-range communication equipment 26 and the occupant terminal 11. The device authentication processor 72 may make the authentication as the occupant on board the automobile 2, only with respect to the occupant terminal 11 present in the vehicle. The device authentication processor 72 may output a device authentication result of the occupant terminal 11 carried by the occupant on board the automobile 2, to the media connection processor 73.

The media connection processor 73 may couple the automobile 2 to the occupant data server apparatus 4 coupled to the communication network 6, with the use of the mobile communication equipment 25, to carry out communication with the occupant data server apparatus 4. The media connection processor 73 may couple the automobile 2 to, for example, the occupant data server apparatus 4 with the use of, for example, the mobile communication equipment 25, to carry out data communication with the occupant data server apparatus 4. The media connection processor 73 may couple the automobile 2 to the occupant data server apparatus 4 in a case where, for example, the biometric authentication result indicating the authentication is obtained from the biometric authentication processor 71.

The media connection processor 73 may acquire, from, for example, the vehicle memory 22 of the automobile 2, the data to be involved in authentication of connection to the CPU 45 of the occupant data server apparatus 4 for the occupant on board. The media connection processor 73 may transmit the acquired data to the combination authentication processor 74 of the occupant data server apparatus 4.

Moreover, the media connection processor 73 may automatically transmit the emergency report to the occupant data server apparatus 4 in a case where an emergency situation such as an unexpected incident is detected in the automobile 2. In one embodiment of the technology, the media connection processor 73 may serve as the "emergency communication processor". The emergency report may include the data to be involved in the authentication of the connection t the CPU 45 of the occupant data server apparatus 4 for the occupant on hoard.

Thus, the media connection processor 73 is configured to automatically transmit the emergency report to the occupant data server apparatus 4 in the case where the emergency situation in the automobile 2 is detected by the acceleration sensor 29 and the occupant monitoring device 31. In one embodiment of the technology, the media connection processor 73 may serve as the "emergency communication processor".

The combination authentication processor 74 may authenticate a combination of the occupant on board the automobile 2 and the automobile 2. For example, the combination authentication processor 74 may compare the data transmitted from the media connection processor 73 of the automobile 2 for the authentication of the connection, with the data held in the memory 47 of the occupant data server apparatus 4 for the authentication of the connection of the plurality of the occupants. The data transmitted from the automobile 2 for the authentication of the connection may include, without limitation, the captured image of the occupant on board the automobile 2 or the biometric data regarding the occupant based on the captured image, and the vehicle identification data 54 regarding the automobile 2. In a case where all the transmitted data coincides with the data held in the memory 47 of the occupant data server apparatus 4, the combination authentication processor 74 may give an approval of the connection. Otherwise, the combination authentication processor 74 does not have to give the approval of the connection. Upon giving the approval of the connection, the combination authentication processor 74 may notify the setting processor 75 of the approval of the connection through the media connection processor 73 of the automobile 2.

It is generally considered to be sufficient that the data to be transmitted by the media connection processor 73 to the occupant data server apparatus 4 for the authentication of the connection includes the occupant identification data regarding the biometric-authenticated or device-authenticated occupant, and a password. However, in this embodiment, the data to be involved in the authentication of the connection may further include, without limitation, the vehicle identification data 54 regarding the automobile 2 to which the approval is given. This makes it possible for the combination authentication processor 74 of the occupant data server apparatus 4 to not only authenticate that the connection is being established for the registered regular occupant, but also authenticate that the regular occupant is attempting the connection from the regular automobile 2. With the combination authentication processor 74, it is possible for the occupant data server apparatus 4 to authenticate the combination of the regular occupant and the regular automobile 2. Moreover, with the vehicle identification data 54, it is possible for the occupant data server apparatus 4 to authenticate that the connection is established from the legitimate, regular automobile 2. Even in a case where the regular occupant attempts to get the authentication of the connection by an unregistered route from the automobile 2 having the vehicle identification data 54 which is not registered in their occupant data held in the memory 47 of the occupant data server apparatus 4, the occupant data server apparatus 4 may keep from authenticating the connection, as with the case with other occupants. The personalized occupant data registered in the memory 47 of the occupant data server apparatus 4 is kept from being inadvertently transmitted and leaked to the automobile 2 even in a case of regular processing. It is possible to permit the use of the personalized occupant data only within a limited range of the automobile 2 registered together with the occupant. In the personalized occupant data regarding the respective occupants, the vehicle identification data regarding a plurality of the automobiles 2 used by each occupant may be registered.

Thus, the combination authentication processor 74 is configured to authenticate the combination of the occupant authenticated by the "first authentication processor" and the vehicle for which the occupant is authenticated. In one embodiment of the technology, the combination authentication processor 74 may serve as a "second authentication processor" in the occupant data server apparatus 4.

The acquisition control processor 76 may make an acquisition control of allowing the media connection processor 73 of the automobile 2 to acquire the data held in the memory 47 of the occupant data server apparatus 4. In the memory 47 of the occupant data server apparatus 4, the access data, the setting data, and the emergency data may be held for each occupant.

For example, in a case where the combination of the occupant and the automobile 2 is unauthenticated by the combination authentication processor 74, the acquisition control processor 76 may basically refrain from permitting the data acquisition by the media connection processor 73 of the automobile 2. In a case where the combination of the occupant and the automobile 2 is authenticated by the combination authentication processor 74, the acquisition control processor 76 may permit the acquisition of the setting data regarding the occupant by the media connection processor 73 of the automobile L. In either case, the acquisition control processor 76 may refrain from permitting the acquisition of the emergency data.

Moreover, upon receipt of the emergency report, for example, in a case where the emergency report comes from the automobile 2 for which the combination of the occupant and the automobile 2 is authenticated by the combination authentication processor 74, the acquisition control processor 76 may permit the acquisition of the emergency data regarding the relevant occupant. Otherwise, the acquisition control processor 76 may refrain from permitting the acquisition of the emergency data even in the case where the emergency report is received.

Thus, the acquisition control processor 76 is configured to control whether or not to make acquirable the personalized emergency data held in the memory 47 as the "server memory" in the occupant data server apparatus 4.

The setting processor 75 may provide the automobile 2 with the occupant-dependent setting in accordance with the occupant on board. For example, as illustrated in the figure, the setting in the automobile 2 may include the travel setting for each occupant, e.g., the seat position, and setting for the network services available in the automobile 2 to the occupant. Upon acquiring the approval of the connection by the authentication of the combination from the combination authentication processor 74, the setting processor 75 may receive and acquire the setting data held in the memory 47 of the occupant data server apparatus 4. The setting data may include, without limitation, the account data at the network service together with the vehicle setting data.

Upon acquiring the approval of the connection from the combination authentication processor 74, or upon the authentication of the occupant by the device authentication processor 72 or the biometric authentication processor 71 the setting processor 75 may acquire the vehicle setting data held in the vehicle memory 22 of the automobile 2.

On the basis of the setting data acquired, the setting processor 75 may provide each part of the automobile 2 with the setting, with the use of the vehicle setting device 34. For example, the setting processor 75 may provide the setting of, for example, the seat position, the steering wheel position, the mirror position, the display setting, the operation setting, the navigation setting, and the travel setting. This makes it possible for the occupant on board the automobile 2 to obtain optimal environment for a drive. For example, it is possible to operate the steering wheel, while being seated on the seat, for example, at an optimal position.

Moreover, in a case where the account data at the network service is acquired as the setting data, the setting processor 75 may allow the media connection processor 73 to establish the connection to the service providing apparatus 9 that provides the network service. The media connection processor 73 may transmit the account data acquired from the occupant data server apparatus 4 to the service providing apparatus 9 from the mobile communication equipment 25, on the basis of an instruction by the setting processor 75 to establish the connection. The service providing apparatus 9 may compare the received account data with the occupant authentication data, to approve the connection. The connection of the media connection processor 73 to the service providing apparatus 9 makes it possible for the control system 3 of the automobile 2 to transmit and receive data to and from the service providing apparatus 9 that provides the network service, through the mobile communication equipment 25.

With such setting, the setting processor 75 is configured to provide the automobile 2 with the setting in accordance with the authenticated occupant, and provide the setting of the connection to the network services to be used in the automobile 2 by the authenticated occupant. The setting processor 75 may automatically provide the setting on the basis of the authentication of the occupant on board the automobile 2. This saves the occupant from operating the vehicle operation device 33 on their own. It is possible for the occupant to obtain optimal environment for a drive and start travel immediately after they get in.

Figure 5:
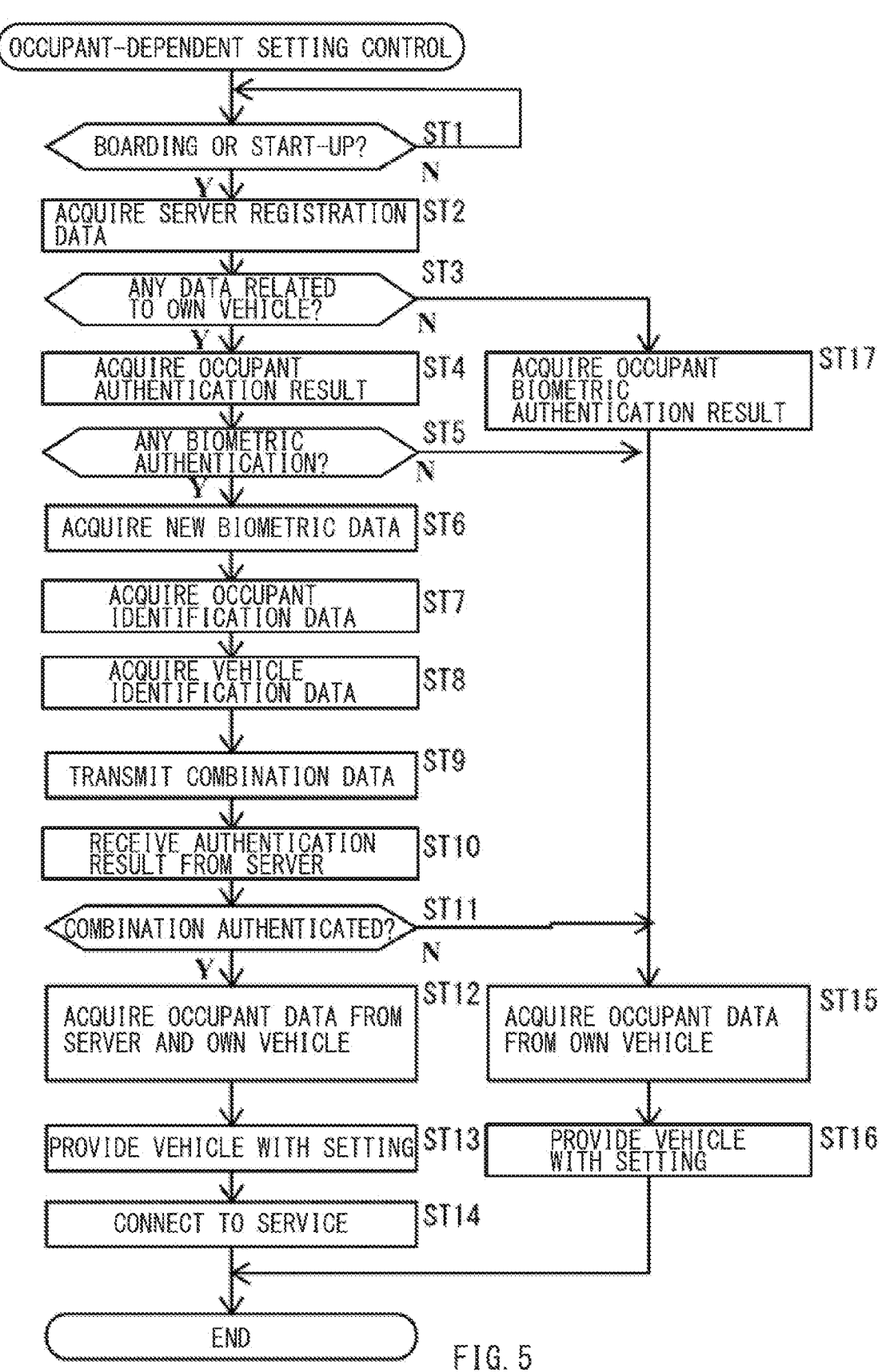
FIG. 5 is a flowchart of a setting control in accordance with an occupant on board the automobile, by the control system of the automobile in FIG. 1.

FIG. 5 is a flowchart of a setting control in accordance with the occupant on board the automobile 2, by the control system 3 of the automobile 2 in FIG. 1.

The vehicle ECU 21 of the control system 3 of the automobile 2 may repetitively carry out the setting control in FIG. 5.

With the setting control in FIG. 5, the vehicle ECU 21 may serve as the plurality of the processors assigned to the automobile 2 as illustrated in, for example, FIG. 4.

In step ST1, the vehicle ECU 21 may determine whether or not a new occupant gets in the automobile 2, or whether or not the automobile 2 makes a start-up with the occupant on hoard. The vehicle ECU 21 may determine whether or not the new occupant gets in the automobile 2 on the basis of, for example, detection of the opening or closing by the door opening and closing sensor 28, new detection of the occupant terminal 11 by the short-range communication equipment 26, and/or new detection of the occupant key 10 by the key proximity sensor 27.

In step ST2, the vehicle ECU 21 may inquire of the occupant data server apparatus 4 a registration state with the use of the mobile communication equipment 25, and acquire presence or absence of server registration data regarding an own vehicle from the occupant data server apparatus 4. Note that the automobile 2 is also referred to as the own vehicle.

In step ST3, the vehicle ECU 21 may determine whether or not data related to the own vehicle is registered in the server registration data acquired from the occupant data server apparatus 4. In a case where the data related to the own vehicle is registered in the occupant data server apparatus 4, the vehicle ECU 21 may cause the flow to proceed to step ST4. In a case where the data related to the own vehicle is not registered in the occupant data server apparatus 4 the vehicle ECU 21 may cause the flow to proceed to step ST17.

In step ST4, the vehicle ECU 21 may acquire the occupant authentication result of the occupant on board the automobile 2.

The biometric authentication processor 71 may compare physical features of the occupant on board the automobile 2 obtained from the captured image with the occupant biometric data registered in the occupant data regarding the plurality of the occupants in the vehicle memory 22. The biometric authentication processor 71 may determine whether or not the occupant on board the automobile 2 is registered in the vehicle memory 22. In a case where the occupant on board the automobile 2 is registered in the vehicle memory 22, the biometric authentication processor 71 may authenticate the occupant as registered.

The device authentication processor 72 may compare the identification data regarding the occupant terminal 11 or the identification data regarding the occupant key 10 of the occupant on board the automobile 2 with the occupant terminal data registered in the occupant data regarding the plurality of the occupants in the vehicle memory 22, The device authentication processor 72 may determine whether or not the occupant on board the automobile 2 is registered in the vehicle memory 22. In a case where the occupant on board the automobile 2 is registered in the vehicle memory 22, the device authentication processor 72 may authenticate the occupant as registered.

The vehicle ECU 21 may acquire, from the biometric authentication processor 71 and the device authentication processor 72, the occupant authentication result of the occupant on board the automobile 2.

In step ST5, the vehicle ECU 21 may determine whether or not the acquired occupant authentication result includes the biometric authentication result. In a case where the biometric authentication processor 71 authenticates the occupant related to the authentication as registered, the vehicle ECU 21 may determine that the acquired occupant authentication result includes the biometric authentication result regardless of the authentication result by the device authentication processor 72, and cause the flow to proceed to step ST6. In a case where the biometric authentication processor 71 does not authenticate the occupant related to the authentication as registered, the vehicle ECU 21 may determine that the acquired occupant authentication result does not include the biometric authentication result, and cause the flow to proceed to step ST15.

In step ST6, the vehicle ECU 21 may acquire new biometric data regarding the biometric-authenticated occupant from the occupant monitoring device 31 or the in-vehicle camera 30. In one embodiment of the technology, the occupant monitoring device 31 may serve as a "biometric data acquisition processor" configured to acquire biometric data regarding the occupant on board. In one example, the biometric data to be acquired by the vehicle ECU 21 in step ST6 may be different from the biometric data on the occasion of the biometric authentication result acquired in step ST4. Such biometric data in step ST6 may include, for example, the captured image taken by the in-vehicle camera 30 at timing later than the biometric data in step ST4, or biometric data to be generated by the occupant monitoring device 31 with respect to the captured image at the later timing. The two-stage authentication based on the different pieces of the biometric data makes it possible to enhance precision of the biometric authentication.

In step ST7, the vehicle ECU 21 may acquire the occupant identification data regarding the biometric-authenticated occupant from the occupant data in the vehicle memory 27.

In step ST8, the vehicle ECU 21 may acquire the vehicle identification data 54 regarding the own vehicle from the vehicle memory 22.

In step ST9, the vehicle ECU 21 may transmit combination data of the occupant and the automobile 2 acquired in steps ST7 to ST8 to the occupant data server apparatus 4 through the base station 5 and the communication network 6 with the use of the mobile communication equipment 25. The occupant data server apparatus 4 may allow the combination authentication processor 74 to compare the received combination data with the combination in the occupant data regarding the plurality of the occupants registered in the memory 47 of the occupant data server apparatus 4. In a case where the received combination data is registered in the memory 47 of the occupant data server apparatus 4, the combination authentication processor 74 of the occupant data server apparatus 4 may authenticate the combination and transmit the authentication result of the combination to the automobile 2 through the communication device 41, the base station 5, and the communication network 6.

In step ST10, the vehicle ECU 21 may receive and acquire, from the occupant data server apparatus 4, with the mobile communication equipment 25, the authentication result by the combination authentication processor 74 with respect to the combination data of the occupant and the automobile 2.

In step ST11, the vehicle ECU 21 may determine whether or not the combination included in the combination data of the occupant and the automobile 2 is authenticated by the combination authentication processor 74 in the occupant data server apparatus 4. In a case where the combination is authenticated in the occupant data server apparatus 4, the vehicle ECU 21 may cause the flow to proceed to step ST12. In a case where the combination is unauthenticated in the occupant data server apparatus 4, the vehicle ECU 21 may cause the flow to proceed to step ST15.

In step ST12, the vehicle ECU 21 may acquire the occupant data regarding the authenticated occupant from the occupant data regarding the plurality of the occupants in the memory 47 of the occupant data server apparatus 4 and the occupant data regarding the plurality of the occupants in the vehicle memory 22 of the own vehicle.

In the occupant data server apparatus 4, the combination authentication processor 74 may authenticate the combination of the occupant and the automobile 2, and thereupon, the acquisition control processor 76 may control whether or not to make acquirable the occupant data regarding the combination-authenticated occupant. In the occupant data regarding the combination-authenticated occupant, the setting data may be made acquirable, while the emergency data may be made unacquirable. Thus, the vehicle ECU 21 may request, with the use of the mobile communication equipment 25, the occupant data server apparatus 4 to transmit the setting data. The vehicle ECU 21 may receive and acquire the setting data regarding the combination-authenticated occupant from the occupant data server apparatus 4.

Moreover, the vehicle ECU 21 may read and acquire the occupant data regarding the authenticated occupant from the vehicle memory 22.

The vehicle ECU 21 may acquire the occupant data regarding the combination-authenticated occupant mainly from, for example, the memory 47 of the occupant data server apparatus 4. In a case where the setting data acquired from the memory 47 of the occupant data server apparatus 4 does not include the vehicle setting data, the vehicle ECU 21 may acquire the vehicle setting data from the vehicle memory 22 of the own vehicle. In this case, the vehicle ECU 21 may acquire the vehicle setting data regarding the combination-authenticated occupant from at least the memory 47 of the occupant data server apparatus 4, out of the memory 47 of the occupant data server apparatus 4 and the vehicle memory 22 of the automobile 2.

In step ST13, the vehicle ECU 21 may provide the own vehicle with the setting, with the use of the vehicle setting device 34, on the basis of the vehicle setting data included in the occupant data acquired. Thus, the setting of, for example, the seat position for the authenticated occupant may be provided, corresponding to the relevant occupant.

In step ST14, the vehicle ECU 21 may couple the own vehicle to the network service, with the mobile communication equipment 25, with the use of the account data at the network service included in the occupant data acquired. Thus, the vehicle ECU 21 may be coupled to the service providing apparatus 9 that provides the network service, through the mobile communication equipment 25, and become ready to receive the service information from the service providing apparatus 9. Thereafter, the vehicle ECU 21 may end the control.

In step ST15, because the combination is unauthenticated by the combination authentication processor 74 of the occupant data server apparatus 4, the vehicle ECU 21 may stop data acquisition from the occupant data server apparatus 4, and acquire the occupant data regarding the authenticated occupant from the vehicle memory 22 of the own vehicle. The authentication in this case may be made solely by either the biometric authentication processor 71 or the device authentication processor 72. The vehicle ECU 21 may acquire the occupant data regarding the occupant authenticated by the biometric authentication processor 71, the device authentication processor 72, or both.

In step ST16, the vehicle ECU 21 may provide the own vehicle with the setting on the basis of the vehicle setting data included in the occupant data acquired from the vehicle memory 22. Thus, the setting of, for example, the seat position for the authenticated occupant may be provided, corresponding to the relevant occupant. Thereafter, the vehicle ECU 21 may end the control.

In step ST17, the vehicle ECU 21 may acquire the occupant authentication result of the occupant on board the automobile 2.

In this case, because the data related to the own vehicle is not registered in the occupant data server apparatus 4, unlike step ST4, the vehicle ECU 21 may acquire only the biometric authentication result by the biometric authentication processor 71, out of the authentication result by the biometric authentication processor 71 and the authentication result by the device authentication processor 72.

Thereafter, the vehicle ECU 21 may cause the flow to proceed to step ST15. The vehicle ECU 21 may acquire the occupant data regarding the biometric-authenticated occupant from the vehicle memory 22 of the own vehicle, and provide the own vehicle with the setting on the basis of the vehicle setting data included in the occupant data acquired. Thereafter, the vehicle ECU 21 may end the control.

As described, in the setting control in FIG. 5, in the case where the occupant is biometric-authenticated by the biometric authentication processor 71, the vehicle ECU 21 may transmit the combination data of the occupant and the automobile 2 to the occupant data server apparatus 4. For example, the combination authentication processor 74 of the occupant data server apparatus 4 may authenticate the combination of the occupant and the automobile 2 by the combination of the occupant identification data regarding the occupant biometric-authenticated by the biometric authentication processor 71 and the vehicle identification data 54 regarding the automobile 2 for which the authentication is made. In the case where the occupant of the automobile 2 is biometric-unauthenticated by the biometric authentication processor 71, the combination authentication processor 74 may refrain from making the authentication because the combination authentication processor 74 does not obtain the combination data of the occupant and the automobile 2.

It is to be noted that the two-stage authentication of the occupant on board the automobile 2 may be carried out without the forgoing processes of steps ST1 to ST3.

In one alternative, instead of the processes of steps ST1 to ST3, the vehicle ECU 21 may determine, for example, presence or absence, in the vehicle memory 22, of connection data to the occupant data server apparatus 4. In a case with the presence of the connection data, the vehicle ECU 21 may cause the flow to proceed to step ST4. In a case with the absence of the connection data, the vehicle ECU 21 may cause the flow to proceed to step ST17.

Figure 6:
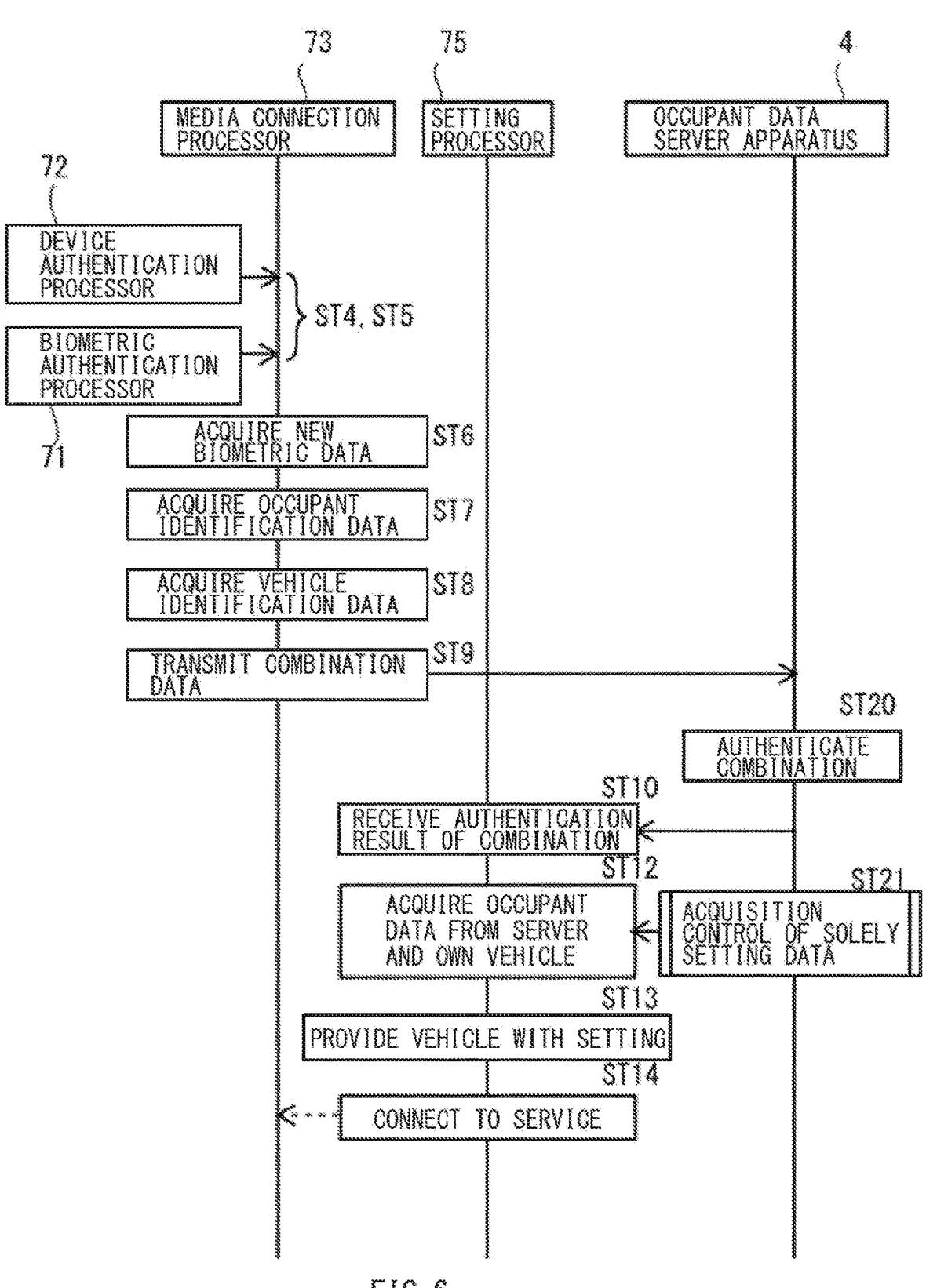
FIG. 6 is a timing chart of a setting control in the emergency reporting system, corresponding to the setting control of the automobile in FIG. 5.

FIG. 6 is a timing chart of a setting control in the emergency reporting system 1, corresponding to the setting control of the automobile 2 in FIG. 1.

FIG. 6 is an example case of the two-stage authentication of the occupant in the emergency reporting system 1 for the automobile 2 in FIG. 1.

FIG. 6 illustrates the occupant data server apparatus 4, together with the biometric authentication processor 71, the device authentication processor 72, the media connection processor 73, and the setting processor 75 that are realized on the vehicle ECU 21 of the automobile 2. In the figure, time flows from top to bottom.

In the following, description is given of an example of a state in which the first occupant is on board the automobile 2. The description assumes that the vehicle ECU 21 of the automobile 2 carries out the setting processing in FIG. 5 mainly as the media connection processor 73.

In step ST4 in FIG. 6, the vehicle ECU 21 as the media connection processor 73 of the automobile 2 may acquire the occupant authentication result by the biometric authentication processor 71 and the occupant authentication result by the device authentication processor 72 for the first occupant on board the automobile 2. In step ST5, the vehicle ECU 21 as the media connection processor 73 of the automobile 2 may determine that the biometric authentication result is included. In this case, in steps ST6 to ST9, the vehicle ECU 21 as the media connection processor 73 may acquire the occupant identification data, the new biometric data, and the vehicle identification data 54 regarding the first occupant on board the automobile 2, from the occupant data regarding the first occupant in the vehicle memory 22. The vehicle ECU 21 as the media connection processor 73 may transmit the data acquired to the occupant data server apparatus 4. Thus, in the case where the occupant on board the automobile 2 is authenticated by the biometric authentication processor 71, the vehicle ECU 21 of the automobile 2, as the media connection processor 73, may transmit the combination data for the authentication of the combination of the occupant on board the automobile 2 and the automobile 2 with the occupant on board, to the occupant data server apparatus 4, to obtain the authentication by the combination authentication processor 74 in a state in which no emergency situation in the automobile 2 is detected. In one embodiment of the technology, the media connection processor 73 may serve as the "emergency communication processor".

The communication device 41 of the occupant data server apparatus 4 may receive the combination data. Thereupon, in step ST20, the CPU 45 of the occupant data server apparatus 4, as the combination authentication processor 74, may compare the received combination data with the occupant data regarding the plurality of the occupants in the memory 47 of the occupant data server apparatus 4, and authenticate the combination. The combination authentication processor 74 may authenticate the combination on the basis of the biometric data acquired at different timing from the biometric data used in the authentication by the biometric authentication processor 71. Thereafter, the combination authentication processor 74 may transmit the authentication result of the combination indicating that the first occupant is the registered occupant, to the setting processor 75 of the automobile 2 through the media connection processor 73. The authentication result may be transmitted from the communication device 41 of the occupant data server apparatus 4 to the automobile 2 through the communication network 6 and the base station 5.

Moreover, in the case where the combination of the first occupant and the automobile 2 is authenticated by the combination authentication processor 74, in step ST21, the CPU 45 of the occupant data server apparatus 4, as the acquisition control processor 76, may control whether or not to make acquirable the occupant data held in the memory 47 of the occupant data server apparatus 4. Within the occupant data regarding the combination-authenticated occupant, the acquisition control processor 76 may make the setting data acquirable, and make the emergency data unacquirable.

In the automobile 2, in step ST10, the vehicle ECU 21 as the setting processor 75 may receive the authentication result by the combination authentication processor 74 of the combination data of the occupant and the automobile 2, from the occupant data server apparatus 4, with the mobile communication equipment 25.

The vehicle ECU 21 of the automobile 2, as the media connection processor 73, may instruct the setting processor 75 to provide setting. In steps ST12 to ST14, the vehicle ECU 21, as the setting processor 75, may acquire the occupant data regarding the first occupant from the memory 47 of the occupant data server apparatus 4 and the vehicle memory 22 of the own vehicle. The vehicle ECU 21 of the automobile 2, as the setting processor 75, may provide the own vehicle with the setting, and establish the connection to the network service.

At this occasion, the setting processor 75 may acquire solely the setting data that is made acquirable by the acquisition control processor 76, from the occupant data server apparatus 4.

Thus, in the case where the combination of the first occupant and the automobile 2 is authenticated by the combination authentication processor 74, the setting processor 75 may acquire the occupant data regarding the first occupant from the memory 47 of the occupant data server apparatus 4, and provide the own vehicle with the setting. In one embodiment of the technology, the memory 47 may serve as the "server memory".

For example, in the case where the occupant data regarding the first occupant held in the memory 47 of the occupant data server apparatus 4 includes the vehicle setting data regarding the first occupant, and the combination is authenticated, the setting processor 75 may provide the automobile 2 with the setting with the use of the vehicle setting data held in the memory 47 of the occupant data server apparatus 4.

In addition, for example, in the case where the occupant data regarding the first occupant held in the memory 47 of the occupant data server apparatus 4 includes the account data at the network service available in the automobile 2 to the first occupant, and the combination is authenticated, the setting processor 75 may couple the automobile 2 to the network service with the use of the account data at the network service held in the memory 47 of the occupant data server apparatus 4.

Moreover, in the case where the first occupant is biometric-authenticated by the biometric authentication processor 71 of the automobile 2 and the combination of the first occupant and the automobile 2 is authenticated by the combination authentication processor 74, the setting processor 75 may acquire the vehicle setting data regarding the first occupant from the the memory 47 of the occupant data server apparatus 4 and the vehicle memory 22 as the "vehicle memory", and provide the automobile 2 with the setting.

Moreover, in the case where the first occupant is authenticated by the biometric authentication processor 71 and the combination of the first occupant and the automobile 2 is unauthenticated by the combination authentication processor 74, the setting processor 75 may acquire the vehicle setting data regarding the first occupant solely from the vehicle memory 22 as the "vehicle memory", and provide the automobile 2 with the setting.

Figure 7:
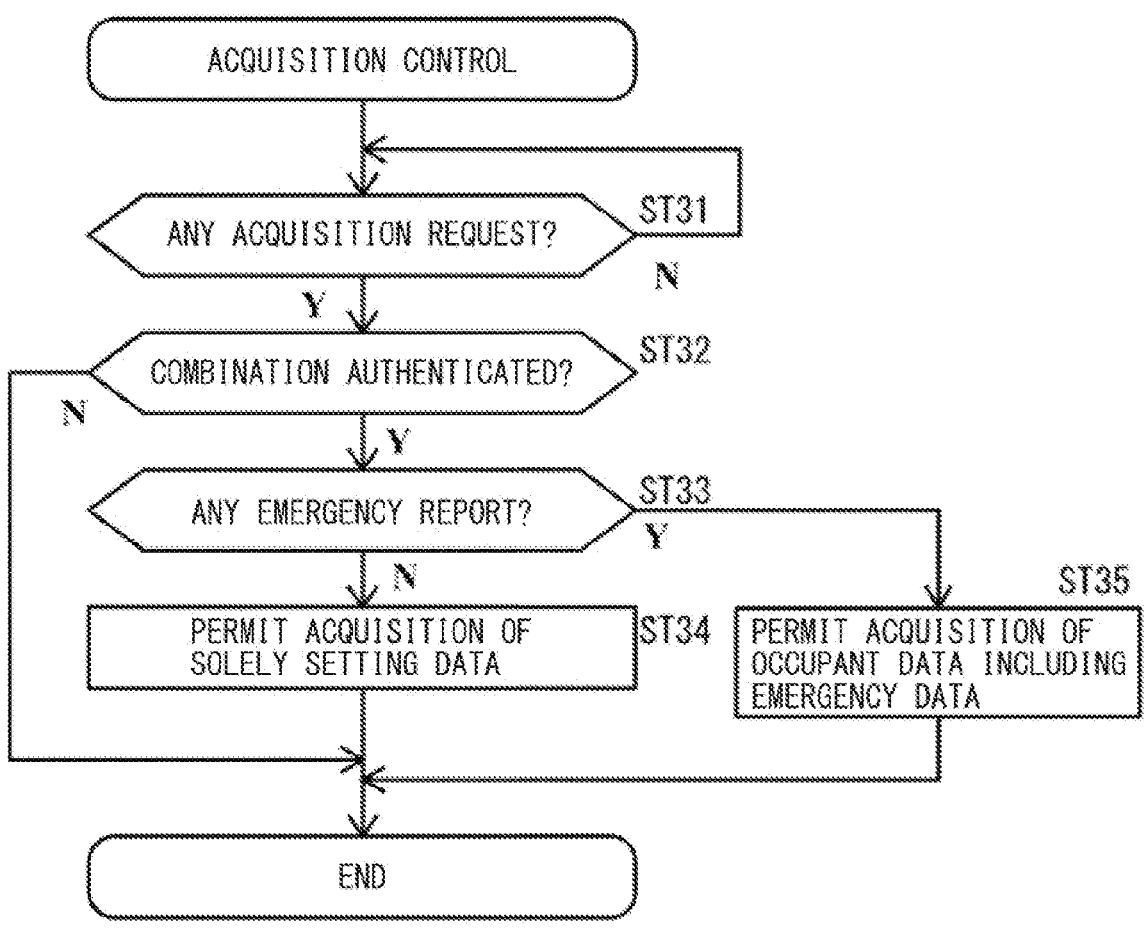
FIG. 7 is a flowchart of an acquisition control, i.e., an occupant data acquirability setting control configured to correspond to step ST21 in FIG. 6, by an acquisition control processor in the occupant data server apparatus in FIG. 1.

FIG. 7 is a flowchart of an acquisition control, i.e., an occupant data acquirability setting control configured to correspond to step ST21 in FIG. 6, by the acquisition control processor e occupant data server apparatus 4 in FIG. 1.

The CPU 45 of the occupant data server apparatus 4, as the acquisition control processor 76, may repetitively carry out the occupant data acquirability setting control in FIG. 7.

In step ST31, the CPU 45, as the acquisition control processor 76, may determine presence or absence of a data acquisition request of the occupant data server apparatus 4. In the case where the combination of the occupant and the automobile 2 is authenticated by the combination authentication processor 74, the automobile 2 may allow the setting processor 75 to transmit the data acquisition request to the occupant data server apparatus 4 through the media connection processor 73. In a case with the absence of the data acquisition request, the CPU 45 may repeat the process. In a case with the presence of the data acquisition request, the CPU 45 may cause the flow to proceed to step ST32.

In step ST32, the CPU 45, as the acquisition control processor 76, may determine whether or not the combination of the occupant related to the data acquisition request and the automobile 2 is authenticated by the combination authentication processor 74. In a case where the combination of the occupant related to the data acquisition request and the automobile 2 is authenticated, the CPU 45 may cause the flow to proceed to step ST33. In a case where the combination of the occupant related to the data acquisition request and the automobile 2 is unauthenticated, the CPU 45 may end the control.

In step ST33, the CPU 45, as the acquisition control processor 76, may determine presence or absence of the emergency report from the automobile 2. Upon detection of an emergency situation such as an unexpected incident, the automobile 2 may automatically transmit the emergency report to the occupant data server apparatus 4. The emergency report may include the authentication data regarding, for example, the occupant as the emergency access data, and may serve as a kind of the data acquisition request. In a case with the absence of the emergency report from the automobile 2, the CPU 45, as the acquisition control processor 76, may cause the flow to proceed to step ST34. In a case with the presence of the emergency report from the automobile 2, the CPU 45, as the acquisition control processor 76, may cause the flow to proceed to step ST35.

In step ST34, the CPU 45, as the acquisition control processor 76, may carry out the acquirability setting control without the emergency report from the automobile 2, and make acquirable solely the setting data, within the occupant data regarding the occupant related to the data acquisition request.

In step ST35, the CPU 45, as the acquisition control processor 76, may carry out the acquirability setting control with the emergency report from the automobile 2, and make acquirable the setting data and the emergency data, within the occupant data regarding the occupant related to the data acquisition request.

As described, the CPU 45, as the acquisition control processor 76, may permit the acquisition of the emergency data held in the memory 47 regarding the occupant on board the automobile 2 in which the emergency situation is detected, only in the case where the emergency access data included in the emergency report received from the automobile 2 in which the emergency situation is detected belongs to the automobile 2 or the occupant combination-authenticated by the combination authentication processor 74, Moreover, the CPU 45 may make acquirable the emergency data held in the memory 47 regarding the occupant on board the automobile 2 in which the emergency situation is detected, in the case where the occupant data server apparatus 4 receives the emergency report from the automobile 2 in which the emergency situation is detected, and at least the combination of the occupant and the automobile 2 is authenticated by the combination authentication processor 74. Otherwise, the CPU 45 may refrain from permitting the acquisition of the emergency data.

Figure 8:
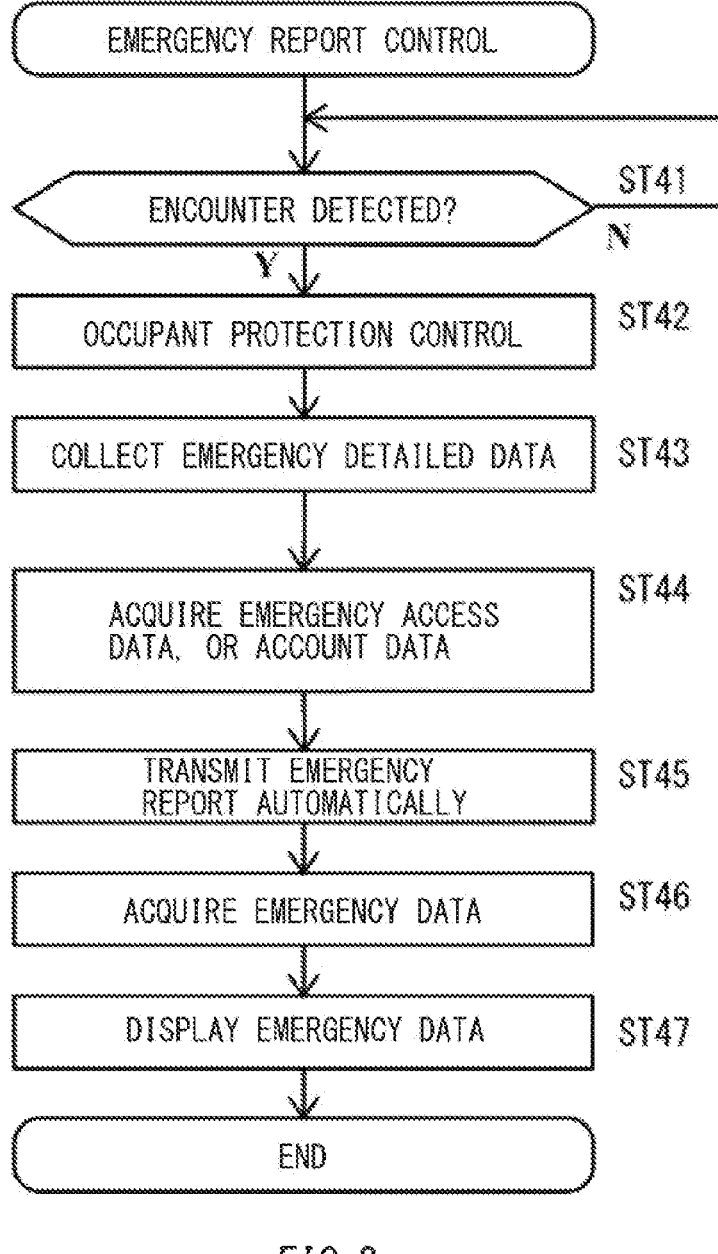
FIG. 8 is a flowchart of an emergency report control by the control system of the automobile in FIG. 1, in a case where the automobile encounters other objects.

FIG. 8 is a flowchart of an emergency report control by the control system 3 of the automobile 2 in FIG. 1, in a case where the automobile 2 encounters other objects.

The vehicle ECU 21 of the control system 3 of the vehicle 2 may repetitively carry out the emergency report control in FIG. 8, as one of the processes by the media connection processor 73.

The vehicle ECU 21 may make the emergency report with respect to other incidents than an encounter of the automobile 2 with other objects, by a similar emergency report control to FIG. 8.

In step ST41, the vehicle ECU 21 may detect the encounter of the automobile 2 with other objects. The vehicle ECU 21 may detect the encounter on the condition that, for example, magnitude of the acceleration rate detected by the acceleration sensor 29 is greater than a threshold for a determination of the encounter. In a case where the vehicle ECU 21 does not detect any encounter, the vehicle ECU 21 may repeat this process. In a case where the vehicle ECU 21 detects the encounter, the vehicle ECU 21 may cause the flow to proceed to step ST42.

In step 5142, the vehicle ECU 21 may carry out an occupant protection process on the basis of the detection of the encounter of the automobile 2 with other objects. The vehicle ECU 21 may actuate an unillustrated seat belt device and an unillustrated airbag device. Thus, the occupant seated on the seat is restrained on the seat, and the impact is absorbed by the airbag.

In step ST43, the vehicle ECU 21 may collect emergency detailed data regarding the current emergency situation from each part of the automobile 2. The vehicle ECU 21 may collect, for example, the present position and the present time of the site the incident happens, from the vehicle GNSS receiver 24. The vehicle ECU 21 may also collect, for example, actuation data of the seat belt device and the airbag device, the acceleration rate of the encounter at the time of the incident detected by the acceleration sensor 29.

In step ST44, the vehicle ECU 21 may acquire the emergency access data to make the access to the occupant data server apparatus 4. The vehicle ECU 21 may acquire, as the emergency access data, the account data held in the vehicle memory 22 to directly log in to the occupant data server apparatus 4.

In addition, for example, the vehicle ECU 21 may record the emergency access data, separately from the account data to log in to the occupant data server apparatus 4. The emergency access data is dedicated to permission of the access to the emergency data on the occasion of the emergency report. The vehicle ECU 21 may acquire the dedicated emergency access data. Such dedicated emergency access data may include, without limitation, dedicated identification data to acquire the emergency data, and a password.

The emergency access data does not have to be provided for each occupant, but may be provided for each automobile 2.

In step ST45, the vehicle ECU 21 may generate the emergency report including the acquired data, and transmit the emergency report to the occupant data server apparatus 4 with the use of the mobile communication equipment 25. The emergency report may include, without limitation, the emergency access data, and data regarding a vehicle type of the automobile 2 and features of the occupant, together with the present position of the site of the incident and the present time. The vehicle ECU 21, as the "emergency communication processor", may transmit the emergency access data regarding each occupant who is unauthenticated by the combination authentication processor 74 of the occupant data server apparatus 4, in the emergency report to be transmitted to the occupant data server apparatus 4.

The communication device 41 may receive the emergency report, and thereupon, the occupant data server apparatus 4 may display the emergency report on the display device 42. This makes it possible for the operator in the call center to check the contents of the emergency report.

Moreover, in the occupant data server apparatus 4, the acquisition control processor 76 may determine, by the acquirability setting control in FIG. 7, that the emergency access data included in the emergency report is the emergency access data regarding the occupant for whom the combination of the occupant and the automobile 2 is authenticated on the basis of the occupant data in the memory 47. In step ST35, the acquisition control processor 76 may make acquirable the emergency data regarding the relevant occupant. The CPU 45 of the occupant data server apparatus 4 may receive the emergency report from the automobile 2 in which the emergency situation is detected after the authentication of the combination, and thereupon, the CPU 45 may make acquirable the access data to the emergency data held in the memory 47. The operator in the call center may operate the occupant data server apparatus 4 or the client terminal 7 of the call center to check the contents of the emergency data regarding the occupant of the automobile 2 in the emergency situation. The emergency data is made acquirable by the control of the acquisition control processor 76.

In step ST46, the mobile communication equipment 25 may receive the emergency data regarding the occupant held in the memory 47 from the occupant data server apparatus 4, and thereupon, the vehicle ECU 21 may acquire the emergency data regarding the occupant.

In step ST47, the vehicle ECU 21 may display and output the acquired emergency data regarding the occupant on the vehicle display device 32, The vehicle ECU 21, as the "emergency communication processor", may acquire, from the occupant data server apparatus 4, the emergency data held in the memory 47 of the occupant data server apparatus 4. The emergency data is permitted to be acquired by the acquisition control processor 76. The vehicle ECU 21, as the "emergency communication processor", may output the acquired emergency data in the automobile 2. The vehicle ECU 21 may volatilly or temporarily record the acquired emergency data in the vehicle memory 22. This makes it possible for the dispatch team that arrives at the site of the incident to check the contents of the emergency data regarding the occupant, on the vehicle display device 32 of the automobile 2. It is possible for the dispatch team to grasp, for example, the health condition of the occupant in the emergency situation, on the vehicle display device 32 of the automobile 2 in the emergency situation, and provide the optimal emergency response corresponding to the health condition at the site in the emergency.

Figure 9:
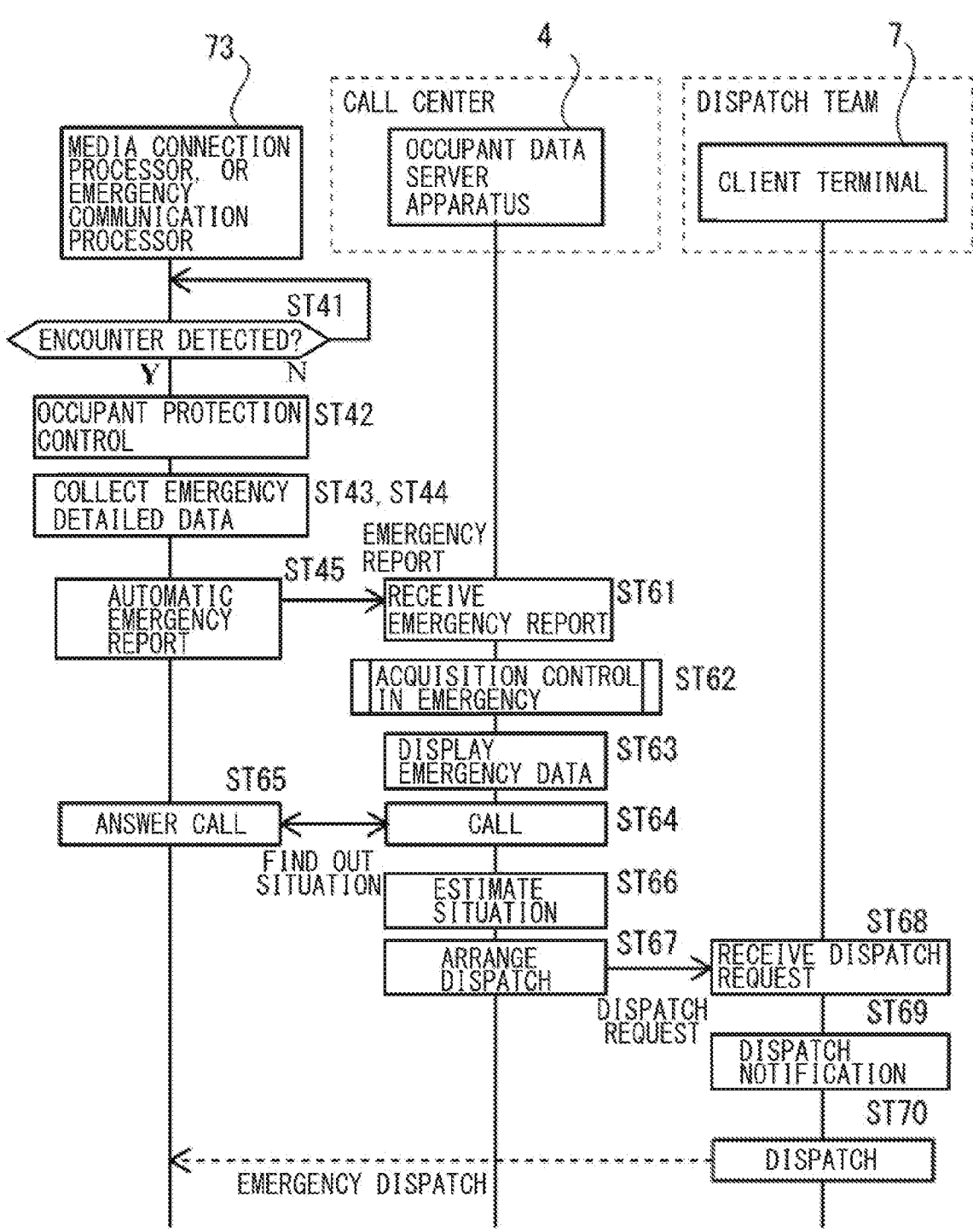
FIG. 9 is a timing chart of an emergency situation control in the emergency reporting system, corresponding to the emergency report control for the automobile in FIG. 8.

FIG. 9 is a timing chart of an emergency situation control in the emergency reporting system 1, corresponding to the emergency report control for the automobile 2 in FIG. 8.

FIG. 9 illustrates the media connection processor 73 by the vehicle ECU 21 of the automobile 2, the occupant data server apparatus 4 in the call center, and the client terminal 7 of the dispatch team. In the figure, time flows from top to bottom.

In the following, described is an example in which the first occupant gets in the automobile 2, and the automobile 2 is involved in an unexpected incident after the setting control in FIG. 6 is carried out.

In step ST41, the vehicle ECU 21 of the automobile 2 may detect the encounter of the automobile 2 with other objects. In step ST42, the vehicle ECU 21 may carry out the occupant protection process. Thereafter, in steps ST43 and ST44, the vehicle ECU 21, as the media connection processor 73, or the "emergency communication processor", may collect the emergency detailed data and acquire the emergency access data. In step ST45, the vehicle ECU 21, as the media connection processor 73, may transmit the emergency report.

In the occupant data server apparatus 4, in step ST61, the communication device 41 may receive the emergency report transmitted by the automobile 2. Thereupon, in step ST62, the CPU 45, as the acquisition control processor 76, may carry out the processing in FIG. 7. The CPU 45 of the occupant data server apparatus 4 may make acquirable the emergency data regarding the first occupant. In step ST63, the CPU 45 of the occupant data server apparatus 4 may display the emergency data regarding the first occupant on the display device 42 of the occupant data server apparatus 4. This makes it possible for the operator in the call center to understand that the automobile 2 of the first occupant is in the emergency situation, and grasp the health condition and the emergency contact data regarding the first occupant, on the display device 42 of the occupant data server apparatus 4. In step ST64, the CPU 45 of the occupant data server apparatus 4 may give a call to the automobile 2. In step ST65, the first occupant can answer the call in the automobile 2 if conscious. This makes it possible for the operator to grasp, for example, the health condition of the occupant together with the contents of the emergency situation and a current state of the occupant, and select the optimal dispatch team. Moreover, in step ST66, the CPU 45 of the occupant data server apparatus 4 may independently estimate the situation. In step ST67, the CPU 45 of the occupant data server apparatus 4 may transmit a dispatch request to the client terminal 7 of the dispatch team selected by the operator.

In step ST68, the client terminal 7 may receive the dispatch request from the occupant data server apparatus 4. Thereupon, in step ST69, the client terminal 7 may give a dispatch notification. At this occasion, the client terminal 7 may display the data acquired by the operator on the display device 42, In step ST70, the dispatch team that receives the dispatch request may be dispatched to the site where the automobile 2 is in the emergency situation.

As described, in this embodiment, the occupant data server apparatus 4 may receive the emergency report from the automobile 2 in which the emergency situation is detected. The memory 47, or the "server memory", of the occupant data server apparatus 4 may hold the emergency data regarding the occupant to be on board the automobile 2. The emergency data may include, for example, the data regarding the health condition of the occupant, e.g., the medical data, the electronic medical record, and the medication data regarding the occupant to be on board the automobile 2. In the case where the occupant data server apparatus 4 receives the emergency report from the automobile 2 in which the emergency situation is detected, the acquisition control processor 76 may make acquirable the emergency data held in the memory 47 of the occupant data server apparatus 4 regarding the occupant on board the automobile 2 in which the emergency situation is detected. This makes it possible for, for example, the operator in the call center who receives the emergency report to acquire and use the emergency data regarding the occupant on board the automobile 2 in which the emergency situation is detected, to make the dispatch request. It is possible for the operator to select the optimal dispatch team and make the dispatch request in consideration of, for example, the health condition of the occupant included in the emergency data.

Moreover, the acquisition control processor 76 in this embodiment may make the emergency data acquirable, in the case where not only the occupant data server apparatus 4 receives the emergency report but also, at least, the combination of the occupant and the automobile 2 is authenticated by the combination authentication processor 74. This hinders the operator from acquiring the emergency data regarding the occupant for whom no emergency situation is detected, or the emergency data regarding the occupant of the automobile 2 who is not subjected to multi-stage authentication by the biometric authentication processor 71 and the combination authentication processor 74. This leads to enhancement in confidentiality and safety of the emergency data.

In particular, in this embodiment, to make the emergency data available, the occupant has to be authenticated by the biometric authentication processor 71, and the combination of the occupant and the automobile 2 has to be authenticated by the combination authentication processor 74. With the use of such multi-element and multi-stage authentication based on not only the authentication of the occupant, it is possible to enhance confidentiality and safety of the emergency data held in the memory 47 of the occupant data server apparatus 4. Moreover, the combination authentication processor 74 is configured to authenticate the combination of the occupant authenticated by at least the biometric authentication processor 71 and the automobile 2 with the occupant on board. This makes it possible to authenticate authorized routing from the automobile 2 to the occupant data server apparatus 4. The combination authentication processor 74 in this embodiment makes it possible to hinder false acquisition or false use of the emergency data, as compared to the case where the occupant data server apparatus 4 authenticates the automobile 2 on the basis of, for example, the authentication of the occupant by the biometric authentication processor 71. This leads to enhancement in confidentiality and safety of the emergency data.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

For example, in the forgoing embodiments, the automobile 2 includes the biometric authentication processor 71 together with the setting processor 75. The setting processor 75 is configured to provide the setting to make the occupant-dependent setting available in the automobile 2. The biometric authentication processor 71 is configured to authenticate the occupant on board the automobile 2.

In an alternative example, the automobile 2 may include the combination authentication processor 74 together with the setting processor 75 and the biometric authentication processor 71. The combination authentication processor 74 is configured to authenticate the combination of the occupant authenticated by the biometric authentication processor 71 and the automobile 2 with the occupant on board.

Moreover, the biometric authentication processor 71 may be realized in the occupant data server apparatus 4.

In the forgoing embodiments, the media connection processor 73 of the automobile 2, as the "emergency communication processor", may transmit the emergency access data regarding each occupant who is unauthenticated by the combination authentication processor 74 of the occupant data server apparatus 4, in the emergency report to be transmitted to the occupant data server apparatus 4. The acquisition control processor 76 of the occupant data server apparatus 4 may permit the acquisition of the emergency data, solely in the case where the emergency access data included in the emergency report received from the automobile 2 in which the emergency situation is detected belongs to the occupant or the automobile 2 authenticated by the combination authentication processor 74.

In an alternative, for example, the media connection processor 73 of the automobile 2, as the "emergency communication processor", may transmit authenticity data indicating that the combination is authenticated by the combination authentication processor 74 of the occupant data server apparatus 4, or the combination data transmitted to get the combination authenticated by the combination authentication processor 74. In this case, the acquisition control processor 76 of the occupant data server apparatus 4 may permit the acquisition of the emergency data regarding the occupant on board the automobile 2 in which the emergency situation is detected, in the case where the emergency report received from the automobile 2 in which the emergency situation is detected includes the combination data or the authenticity data.

The vehicle ECU 21 and the CPU 45 illustrated in FIGS. 2 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle ECU 21 and the CPU 45 illustrated in FIGS. 2 and 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle ECU 21 and the CPU 45 illustrated in FIGS. 2 and 3.

The invention claimed is:

1. An emergency reporting system for a vehicle, the emergency reporting system including the vehicle and a server apparatus, the vehicle including a detector configured to detect an emergency situation of the vehicle with an occupant on board, and the server apparatus being configured to receive an emergency report from the vehicle in which the emergency situation is detected, the emergency reporting system comprising:

a server memory in the server apparatus, the server memory being configured to hold (1) personalized emergency data regarding the occupant to be on board the vehicle or access data to the personalized emergency data, (2) first occupant identification data of the occupant to be on board the vehicle, and (3) first vehicle identification data of the vehicle, wherein the personalized emergency data or the access data, the first occupant identification data, and the first vehicle identification data are associated with one another;

a vehicle memory in the vehicle configured to hold (1) second occupant identification data of the occupant and (2) second vehicle identification of the vehicle associated with the second occupant identification data;

a first authentication processor in the vehicle configured to authenticate the occupant on board the vehicle;

a communication processor in the vehicle configured to acquire, in response to the occupant on board the vehicle being authenticated by the first authentication processor, the second occupant identification data regarding the authenticated occupant and the second vehicle identification data assigned to the vehicle, and simultaneously send the second occupant identification data and the second vehicle identification data to the server apparatus;

a second authentication processor in the server apparatus configured to, in response to receiving the second occupant identification data and the second vehicle identification data, authenticate a combination of the occupant on board the vehicle and the vehicle based on the first occupant identification data and the first vehicle identification data that are held in the server memory; and an acquisition control processor in the server apparatus configured to permit acquisition of the personalized emergency data or the access data to the personalized emergency data held in the server memory only when:
    the server apparatus receives the emergency report from the vehicle in which the emergency situation is detected by the detector of the vehicle; and
    the combination of the occupant and the vehicle is authenticated by the second authentication processor based on a comparison between the second occupant identification data and second vehicle identification data sent from the vehicle and the first occupant identification data and first vehicle identification data stored in the server memory.

2. The emergency reporting system for the vehicle according to claim 1, wherein the acquisition control processor is configured to:
    permit the acquisition of the personalized emergency data or the access data to the personalized emergency data held in the server memory regarding the occupant on board the vehicle in which the emergency situation is detected, in a case where the combination of the occupant and the vehicle is authenticated by the second authentication processor, and the emergency situation is detected by the detector of the vehicle; and
    refrain from permitting the acquisition of the personalized emergency data or the access data to the personalized emergency data held in the server memory, in a case where the emergency situation is detected by the detector of the vehicle for which the combination of the occupant and the vehicle is unauthenticated by the second authentication processor, or in a case the emergency situation is not detected by the detector of the vehicle.

3. The emergency reporting system for the vehicle according to claim 1, wherein the server memory is configured to hold personalized setting data to be set in the vehicle for the occupant to be on board, together with the personalized emergency data or the access data to the personalized emergency data, and the acquisition control processor is configured to:
    permit acquisition of the personalized setting data held in the server memory in a case where the combination of the occupant and the vehicle is authenticated by the second authentication processor while the emergency report is not received from the vehicle in which the emergency situation is detected; and
    permit the acquisition of the personalized emergency data or the access data to the personalized emergency data in addition to the personalized setting data in a case where the combination of the occupant and the vehicle is authenticated by the second authentication processor while the emergency report is received from the vehicle in which the emergency situation is detected.

4. The emergency reporting system for the vehicle according to claim 2, wherein
    the server memory is configured to hold personalized setting data to be set in the vehicle for the occupant to be on board, together with the personalized emergency data or the access data to the personalized emergency data, and
    the acquisition control processor is configured to:
        permit acquisition of the personalized setting data held in the server memory in a case where the combination of the occupant and the vehicle is authenticated by the second authentication processor while the emergency report is not received from the vehicle in which the emergency situation is detected; and
        permit the acquisition of the personalized emergency data or the access data to the personalized emergency data in addition to the personalized setting data in a case where the combination of the occupant and the vehicle is authenticated by the second authentication processor while the emergency report is received from the vehicle in which the emergency situation is detected.

5. The emergency reporting system for the vehicle according to claim 1, further comprising an emergency communication processor configured to transmit the emergency report to the server apparatus in a case where the emergency situation of the vehicle is detected by the detector, wherein
    in a case where the occupant on board the vehicle is authenticated by the first authentication processor in the vehicle, the emergency communication processor is configured to transmit combination authentication data to the server apparatus, to get the combination authenticated by the second authentication processor while the emergency situation of the vehicle is not detected by the detector, the combination authentication data being provided for the second authentication processor to authenticate the combination of the occupant on board the vehicle and the vehicle.

6. The emergency reporting system for the vehicle according to claim 2, further comprising an emergency communication processor configured to transmit the emergency report to the server apparatus in a case where the emergency situation of the vehicle is detected by the detector, wherein
    in a case where the occupant on board the vehicle is authenticated by the first authentication processor in the vehicle, the emergency communication processor is configured to transmit combination authentication data to the server apparatus, to get the combination authenticated by the second authentication processor while the emergency situation of the vehicle is not detected by the detector, the combination authentication data being provided for the second authentication processor to authenticate the combination of the occupant on board the vehicle and the vehicle.

7. The emergency reporting system for the vehicle according to claim 5, wherein the emergency communication processor is configured to acquire, from the server apparatus, the personalized emergency data or the access data to the personalized emergency data held in the server memory and made acquirable by the acquisition control processor.

8. The emergency reporting system for the vehicle according to claim 6, wherein the emergency communication processor is configured to acquire, from the server apparatus, the personalized emergency data or the access data to the personalized emergency data held in the server memory and made acquirable by the acquisition control processor.

9. The emergency reporting system for the vehicle according to claim 5, wherein the vehicle comprises multiple vehicles and the occupant comprises multiple occupants, the emergency communication processor is configured to transmit emergency access data for one or more of the vehicles or for one or more of the occupants unauthenticated by the second authentication processor in the server apparatus, in the emergency report to be transmitted to the server apparatus, and the acquisition control processor is configured to permit acquisition of the personalized emergency data or the access data to the personalized emergency data held in the server memory regarding one occupant of the occupants on board one of the vehicles in which the emergency situation is detected, in a case where the emergency access data included in the emergency report received from the one of the vehicles and the second authentication processor authenticates the one of the vehicles or the one of the occupants regarding the combination.

10. The emergency reporting system for the vehicle according to claim 6, wherein the vehicle comprises multiple vehicles and the occupant comprises multiple occupants, the emergency communication processor is configured to transmit emergency access data for one or more of the vehicles or for one or more of the occupants unauthenticated by the second authentication processor in the server apparatus, in the emergency report to be transmitted to the server apparatus, and the acquisition control processor is configured to permit acquisition of the personalized emergency data or the access data to the personalized emergency data held in the server memory regarding one occupant of the occupants on board one of the vehicles in which the emergency situation is detected, in a case where the emergency access data included in the emergency report received from the one of the vehicles and the second authentication processor authenticates the one of the vehicles or the one of the occupants regarding the combination.

11. The emergency reporting system for the vehicle according to claim 5, wherein the emergency communication processor is configured to transmit authenticity data indicating that the combination is authenticated by the second authentication processor in the server apparatus, or the combination authentication data transmitted to get the combination authenticated by the second authentication processor, in the emergency report to be transmitted to the server apparatus, and the acquisition control processor is configured to permit the acquisition of the personalized emergency data or the access data to the personalized emergency data held in the server memory regarding the occupant on board the vehicle in which the emergency situation is detected, in a case where the emergency report received from the vehicle in which the emergency situation is detected includes the combination authentication data or the authenticity data.

12. The emergency reporting system for the vehicle according to claim 6, wherein the emergency communication processor is configured to transmit authenticity data indicating that the combination is authenticated by the second authentication processor in the server apparatus, or the combination authentication data transmitted to get the combination authenticated by the second authentication processor, in the emergency report to be transmitted to the server apparatus, and the acquisition control processor is configured to permit the acquisition of the personalized emergency data or the access data to the personalized emergency data held in the server memory regarding the occupant on board the vehicle in which the emergency situation is detected, in a case where the emergency report received from the vehicle in which the emergency situation is detected includes the combination authentication data or the authenticity data.

13. The emergency reporting system for the vehicle according to claim 1, wherein the personalized emergency data includes any one of medical data, an electronic medical record, medication data, or emergency contact data regarding the occupant to be on board the vehicle.

14. The emergency reporting system for the vehicle according to claim 2, wherein the personalized emergency data includes any one of medical data, an electronic medical record, medication data, or emergency contact data regarding the occupant to be on board the vehicle.

15. A vehicle configured to make an emergency report to a server apparatus in a case where an emergency situation of the vehicle is detected, the server apparatus including a server memory configured to hold (1) personalized emergency data regarding an occupant to be on board the vehicle or access data to the personalized emergency data, (2) first occupant identification data of the occupant to be on board the vehicle, and (3) first vehicle identification data of the vehicle, wherein the personalized emergency data or the access data, the first occupant identification data, and the first vehicle identification data are associated with one another, the vehicle comprising:

a vehicle memory in the vehicle configured to hold (1) second occupant identification data of the occupant and (2) second vehicle identification of the vehicle associated with the second occupant identification data;

a detector configured to detect the emergency situation of the vehicle with the occupant on board;

a first authentication processor configured to authenticate the occupant on board the vehicle; and a communication processor configured to acquire, in response to the occupant on board the vehicle being authenticated by the first authentication processor, the second occupant identification data regarding the authenticated occupant and the second vehicle identification data assigned to the vehicle, and simultaneously send the second occupant identification data and the second vehicle identification data to the server apparatus, wherein the server apparatus comprises:

a second authentication processor configured to, in response to receiving the second occupant identification data and the second vehicle identification data, authenticate a combination of the occupant on board the vehicle and the vehicle based on the first occupant identification data and the first vehicle identification data that are held in the server memory; and an acquisition control processor is configured to permit acquisition of the personalized emergency data or the access data to the personalized emergency data held in the server memory only when:

the server apparatus receives the emergency report from the vehicle in which the emergency situation is detected by the detector of the vehicle; and the combination of the occupant and the vehicle is authenticated by the second authentication processor based on a comparison between the second occupant identification data and second vehicle identification data sent from the vehicle and the first occupant identification data and first vehicle identification data stored in the server memory.

16. The vehicle according to claim 15, wherein the first authentication processor is provided in the vehicle, and the acquisition control processor and the second authentication processor are provided in the server apparatus.

17. A vehicle configured to make an emergency report to a server apparatus in a case where an emergency situation of the vehicle is detected, the server apparatus including a server memory configured to hold (1) personalized emergency data regarding an occupant to be on board the vehicle or access data to the personalized emergency data, (2) first occupant identification data of the occupant to be on board the vehicle, and (3) first vehicle identification data of the vehicle, wherein the personalized emergency data or the access data, the first occupant identification data, and the first vehicle identification data are associated with one another, the vehicle comprising:

a vehicle memory in the vehicle configured to hold (1) second occupant identification data of the occupant and (2) second vehicle identification of the vehicle associated with the second occupant identification data;

an acceleration sensor configured to detect the emergency situation of the vehicle with the occupant on board; and circuitry configured to:

detect the emergency situation of the vehicle with the occupant on board, authenticate the occupant on board the vehicle, and in response to the occupant on board the vehicle being authenticated, acquire the second occupant identification data regarding the authenticated occupant and the second vehicle identification data assigned to the vehicle, and simultaneously send the second occupant identification data and the second vehicle identification data to the server apparatus, wherein the server apparatus comprises circuitry configured to:

authenticate, in response to receiving the second occupant identification data and the second vehicle identification data, a combination of the occupant on board the vehicle and the vehicle based on the first occupant identification data and the first vehicle identification data that are held in the server memory; and permit acquisition of the personalized emergency data or the access data to the personalized emergency data held in the server memory only when:

the server apparatus receives the emergency report from the vehicle in which the emergency situation is detected; and the combination of the occupant and the vehicle is authenticated based on a comparison between the second occupant identification data and second vehicle identification data sent from the vehicle and the first occupant identification data and first vehicle identification data stored in the server memory.

* * * * *